United States Patent
Mimura et al.

(10) Patent No.: US 7,372,964 B2
(45) Date of Patent: May 13, 2008

(54) METHOD AND APPARATUS FOR RECORDING INFORMATION INCLUDING SECRET INFORMATION AND METHOD AND APPARATUS FOR REPRODUCTION THEREOF

(75) Inventors: Hideki Mimura, Yokohama (JP); Kouya Tochikubo, Yokohama (JP); Taku Kato, Kamakura (JP); Tooru Kamibayashi, Chigasaki (JP); Akio Tanaka, Yokohama (JP); Hisashi Yamada, Yokohama (JP); Tadashi Kojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 863 days.

(21) Appl. No.: 10/237,182

(22) Filed: Sep. 9, 2002

(65) Prior Publication Data
US 2003/0070082 A1    Apr. 10, 2003

(30) Foreign Application Priority Data
Oct. 10, 2001    (JP)    ............................. 2001-312983
Oct. 25, 2001    (JP)    ............................. 2001-328079

(51) Int. Cl.
*H04L 9/00*    (2006.01)
*H04L 1/00*    (2006.01)
*G11B 7/00*    (2006.01)
*H04K 1/00*    (2006.01)

(52) U.S. Cl. .................. 380/281; 369/116; 705/55; 713/176; 380/277

(58) Field of Classification Search ................ 380/281, 380/277; 369/116; 713/176
See application file for complete search history.

(56) References Cited

U.S. PATENT DOCUMENTS

| 5,109,152 | A | * | 4/1992 | Takagi et al. ................ 235/380 |
| 5,392,351 | A | * | 2/1995 | Hasebe et al. ................ 705/51 |
| 5,714,952 | A |   | 2/1998 | Wada |
| 5,796,826 | A | * | 8/1998 | Park ........................... 380/203 |
| 5,881,038 | A | * | 3/1999 | Oshima et al. ........... 369/47.12 |
| 5,901,127 | A |   | 5/1999 | Sako et al. |
| 5,912,869 | A | * | 6/1999 | Tanaka et al. ........... 369/59.23 |
| 5,948,136 | A | * | 9/1999 | Smyers ....................... 710/107 |
| 6,026,232 | A | * | 2/2000 | Yogeshwar et al. .......... 715/719 |

(Continued)

FOREIGN PATENT DOCUMENTS

CN    1262770 A    8/2000

(Continued)

OTHER PUBLICATIONS

Japanese Office Action dated Feb. 1, 2005 for Appln. No. 2001-312983.

(Continued)

*Primary Examiner*—Emmanuel L. Moise
*Assistant Examiner*—Techane Gergiso
(74) *Attorney, Agent, or Firm*—Pillsbury Winthrop Shaw Pittman, LLP

(57) ABSTRACT

An information recording method for recording content information in a recording medium having at least re-readable area, comprising converting, based on a first conversion rule $\phi 1$, first information including a first component for obtaining content control information, converting, based on a second conversion rule $\phi 2$, second information including a second component for obtaining the first information, and writing the converted first information and the converted second information into the re-recordable area of the recording medium.

18 Claims, 24 Drawing Sheets

U.S. PATENT DOCUMENTS

| | | | |
|---|---|---|---|
| 6,144,743 A * | 11/2000 | Yamada et al. | 380/44 |
| 6,157,606 A * | 12/2000 | Inazawa et al. | 369/116 |
| 6,223,285 B1 * | 4/2001 | Komuro et al. | 713/160 |
| 6,226,618 B1 * | 5/2001 | Downs et al. | 705/1 |
| 6,317,397 B1 * | 11/2001 | Deguchi et al. | 369/47.19 |
| 6,320,829 B1 * | 11/2001 | Matsumoto et al. | 369/47.12 |
| 6,347,145 B2 | 2/2002 | Kato et al. | |
| 6,434,538 B1 * | 8/2002 | Ibaraki et al. | 705/57 |
| 6,445,795 B1 | 9/2002 | Sako et al. | |
| 6,477,649 B2 * | 11/2002 | Kambayashi et al. | 726/27 |
| 6,490,683 B1 | 12/2002 | Yamada et al. | |
| 6,516,064 B1 * | 2/2003 | Osawa et al. | 380/201 |
| 6,556,679 B1 * | 4/2003 | Kato et al. | 380/203 |
| 6,571,220 B1 * | 5/2003 | Ogino et al. | 705/51 |
| 6,580,682 B1 * | 6/2003 | Kamperman et al. | 369/275.3 |
| 6,618,549 B1 * | 9/2003 | Kato et al. | 386/94 |
| 6,684,199 B1 * | 1/2004 | Stebbings | 705/57 |
| 6,687,683 B1 * | 2/2004 | Harada et al. | 705/51 |
| 6,700,989 B1 * | 3/2004 | Itoh et al. | 382/100 |
| 6,868,404 B1 * | 3/2005 | Ono et al. | 705/55 |
| 6,912,634 B2 * | 6/2005 | Ripley et al. | 711/164 |
| 7,000,113 B1 * | 2/2006 | Linnartz | 713/176 |
| 2001/0021255 A1 * | 9/2001 | Ishibashi | 380/277 |
| 2001/0033658 A1 * | 10/2001 | Yoshida et al. | 380/201 |
| 2001/0038694 A1 * | 11/2001 | Senshu | 380/201 |
| 2001/0046295 A1 | 11/2001 | Sako et al. | |
| 2002/0006199 A1 * | 1/2002 | Sako et al. | 380/201 |
| 2002/0044657 A1 * | 4/2002 | Asano et al. | 380/201 |
| 2002/0085722 A1 | 7/2002 | Asano et al. | |
| 2002/0141576 A1 * | 10/2002 | Ripley et al. | 380/201 |
| 2003/0061500 A1 | 3/2003 | Mimura et al. | |
| 2003/0070082 A1 | 4/2003 | Nimura et al. | |
| 2003/0115534 A1 | 6/2003 | Kojima et al. | |

FOREIGN PATENT DOCUMENTS

| | | |
|---|---|---|
| EP | 0 944 084 A2 | 9/1999 |
| JP | 6-20403 | 1/1994 |
| JP | 8-204584 | 8/1996 |
| JP | 8-286840 | 11/1996 |
| JP | 9-73414 | 3/1997 |
| JP | 9-93226 | 4/1997 |
| JP | 9-128990 | 5/1997 |
| JP | 10-106148 | 4/1998 |
| JP | 10-171717 | 6/1998 |
| JP | 10-214233 | 8/1998 |
| JP | 10-241290 | 9/1998 |
| JP | 10-320779 | 12/1998 |
| JP | 11-86436 | 3/1999 |
| JP | 11-154184 | 6/1999 |
| JP | 11-238305 | 8/1999 |
| JP | 2000-3560 | 1/2000 |
| JP | 2000-295208 | 10/2000 |
| JP | 2000-339699 | 12/2000 |
| JP | 2001-43138 | 2/2001 |
| JP | 2001-77806 | 3/2001 |
| JP | 2001-135019 | 5/2001 |
| JP | 2001-176189 | 6/2001 |
| JP | 2001-222861 | 8/2001 |
| JP | 2002-84271 | 3/2002 |
| JP | 2003-132625 | 5/2003 |

OTHER PUBLICATIONS

Japanese Office Action dated Jan. 10, 2006 for Appln. No. 2001-312983.

Chinese Office Action dated May 13, 2005 for Appln. No. 02142533.7.

Japanese Office Action, dated Jul. 13, 2004 for Patent Application No. 2001-328079.

* cited by examiner

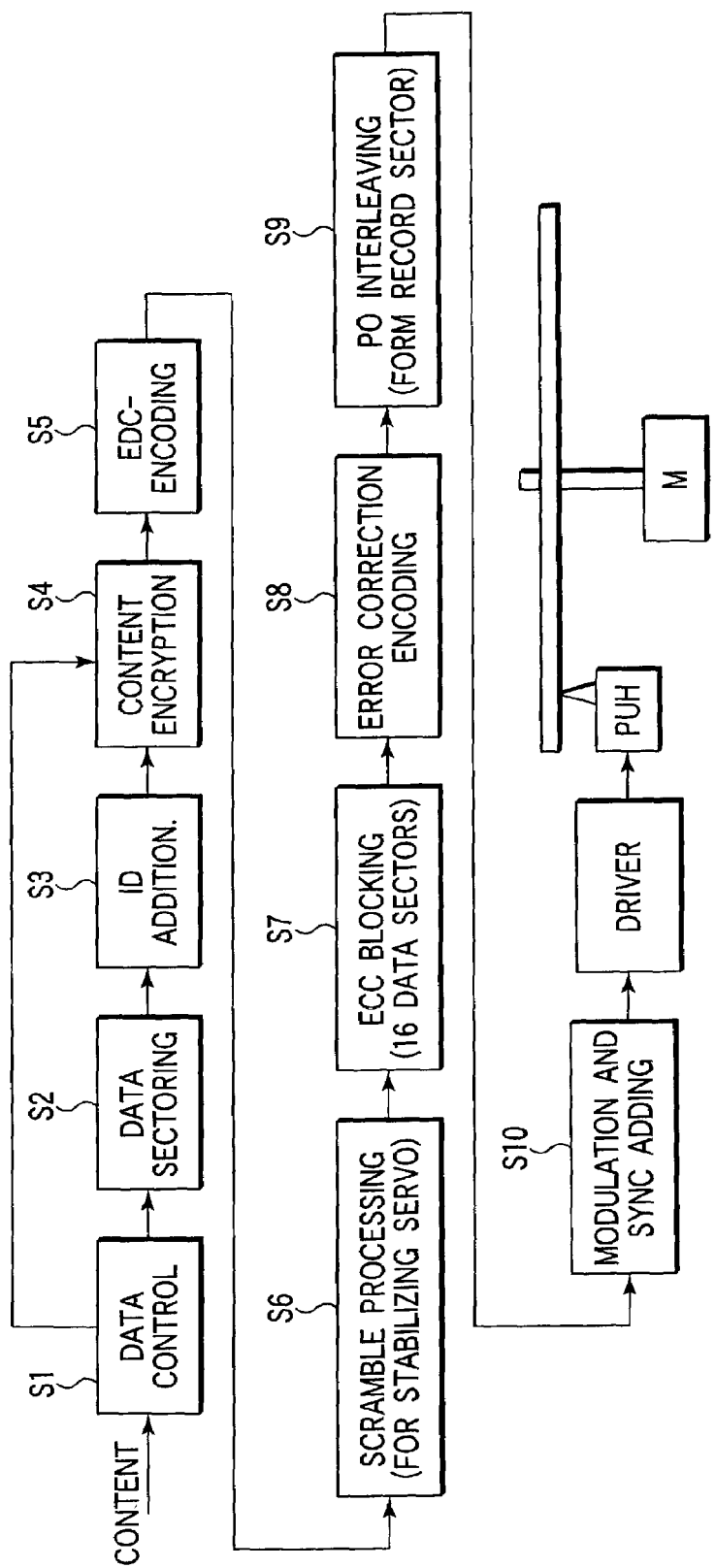
F I G. 5

| Data Symbol | STATE 1 | | STATE 2 | | STATE 3 | | STATE 4 | |
|---|---|---|---|---|---|---|---|---|
| | Code Word | Next-S | Code Word | Next-S | Code Word | Next-S | Code Word | Next-S |
| 0 | 001000000001001 | 1 | 010000100100000 | 2 | 001000000001001 | 1 | 010000100100000 | 2 |
| 1 | 001000000010010 | 1 | 001000000010010 | 1 | 100000100100000 | 3 | 100000100100000 | 3 |
| 2 | 001000010010000 | 2 | 001000100100000 | 2 | 100000000010010 | 1 | 100000000010010 | 1 |
| 3 | 001000001001000 | 2 | 010001001000000 | 4 | 001000001001000 | 2 | 010001001000000 | 4 |
| 4 | 001000010010000 | 2 | 001000010010000 | 2 | 100000100100000 | 2 | 100000100100000 | 2 |
| 5 | 001000000100100 | 2 | 001000000100100 | 2 | 100100100000000 | 4 | 100100100000000 | 4 |
| 6 | ... | | ... | | ... | | ... | |
| 7 | | | | | | | | |

FIG. 11

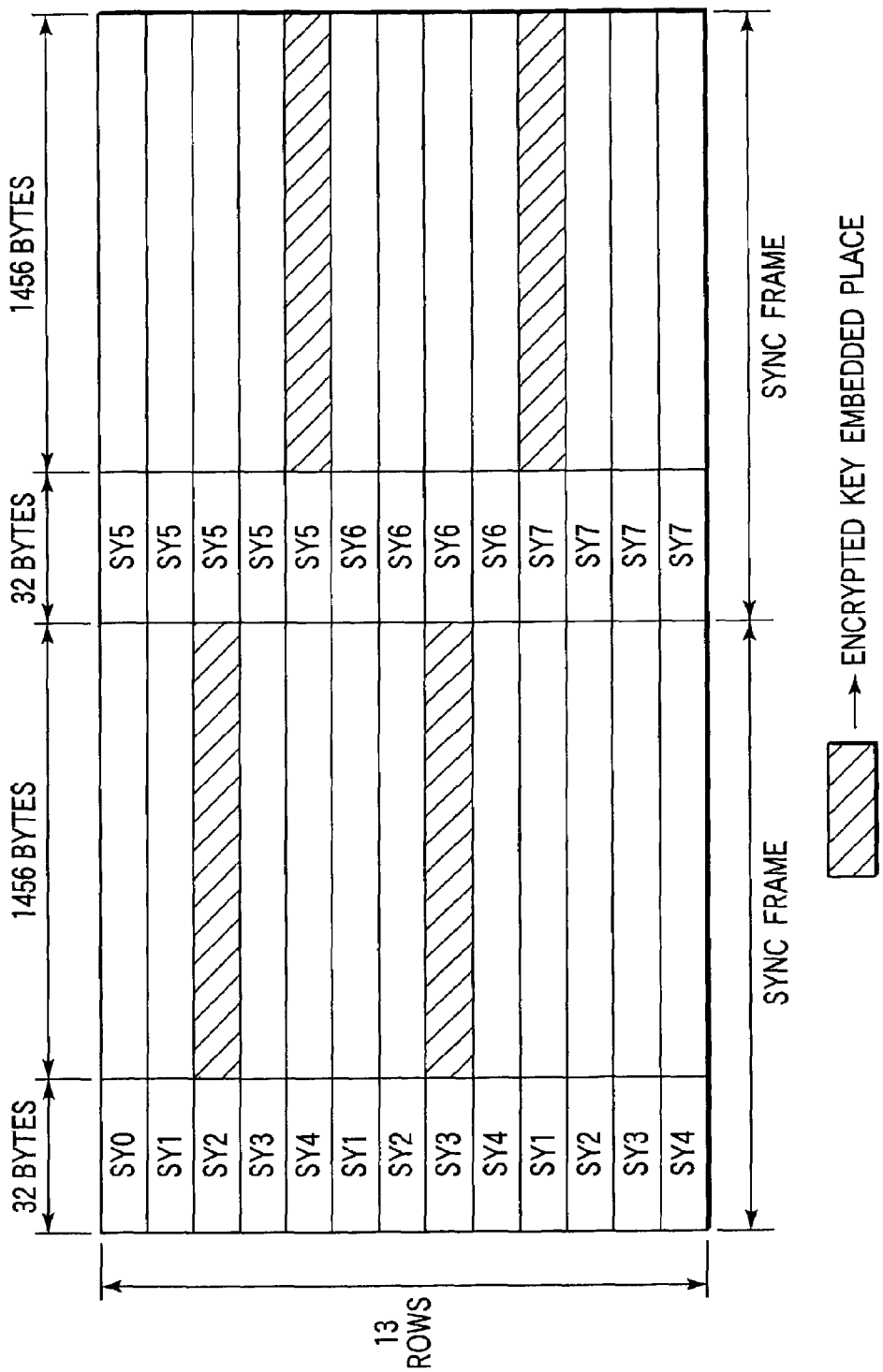
F I G. 14

| SYNC-l | A | B | C | D | E | F | G | H | I | J | K | L | M | N | O | P | Q |
|---|---|---|---|---|---|---|---|---|---|---|---|---|---|---|---|---|---|
| SYNC-m | A | B | C | D | E | F | G | H | I | J | K | L | M | N | O | P | Q |
| SYNC-n | CP0 | CP1 | CP2 | CP3 | CP4 | CP5 | CP6 | CP7 | CP8 | CP9 | CPA | CPB | CPC | CPD | CPE | CPF | |
| SYNC-o | A | B | C | D | E | F | G | H | I | J | K | L | M | N | O | P | Q |
| SYNC-p | A | B | C | D | E | F | G | H | I | J | K | L | M | N | O | P | Q |

20D (8 CHANNEL BITS)

F I G. 16

| SYNC-l | A | B | C | D | E | F | G | H | I | J | K | L | M | N | O | P | Q |
|---|---|---|---|---|---|---|---|---|---|---|---|---|---|---|---|---|---|
| SYNC-m | A | B | C | D | E | F | G | H | I | J | K | L | M | N | O | P | Q |
| SYNC-n | CP0 | CP1 | CP2 | CP3 | CP4 | CP5 | CP6 | CP7 | CP8 | CP9 | CPA | | | | | | |
| SYNC-o | A | B | C | D | E | F | G | H | I | J | K | L | M | N | O | P | Q |
| SYNC-p | A | B | C | D | E | F | G | H | I | J | K | L | M | N | O | P | Q |

F I G. 17

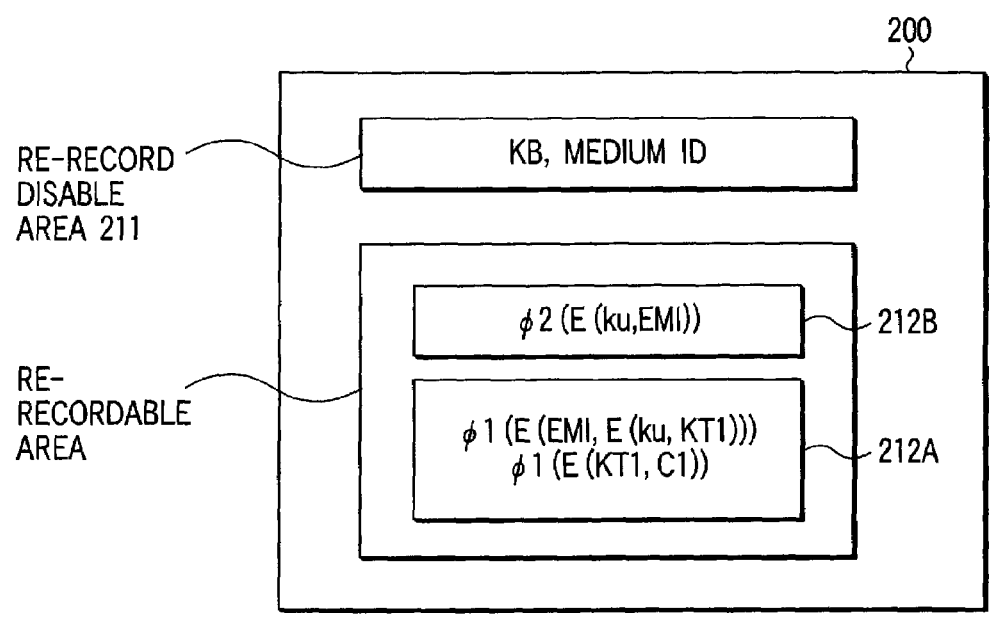
F I G. 24

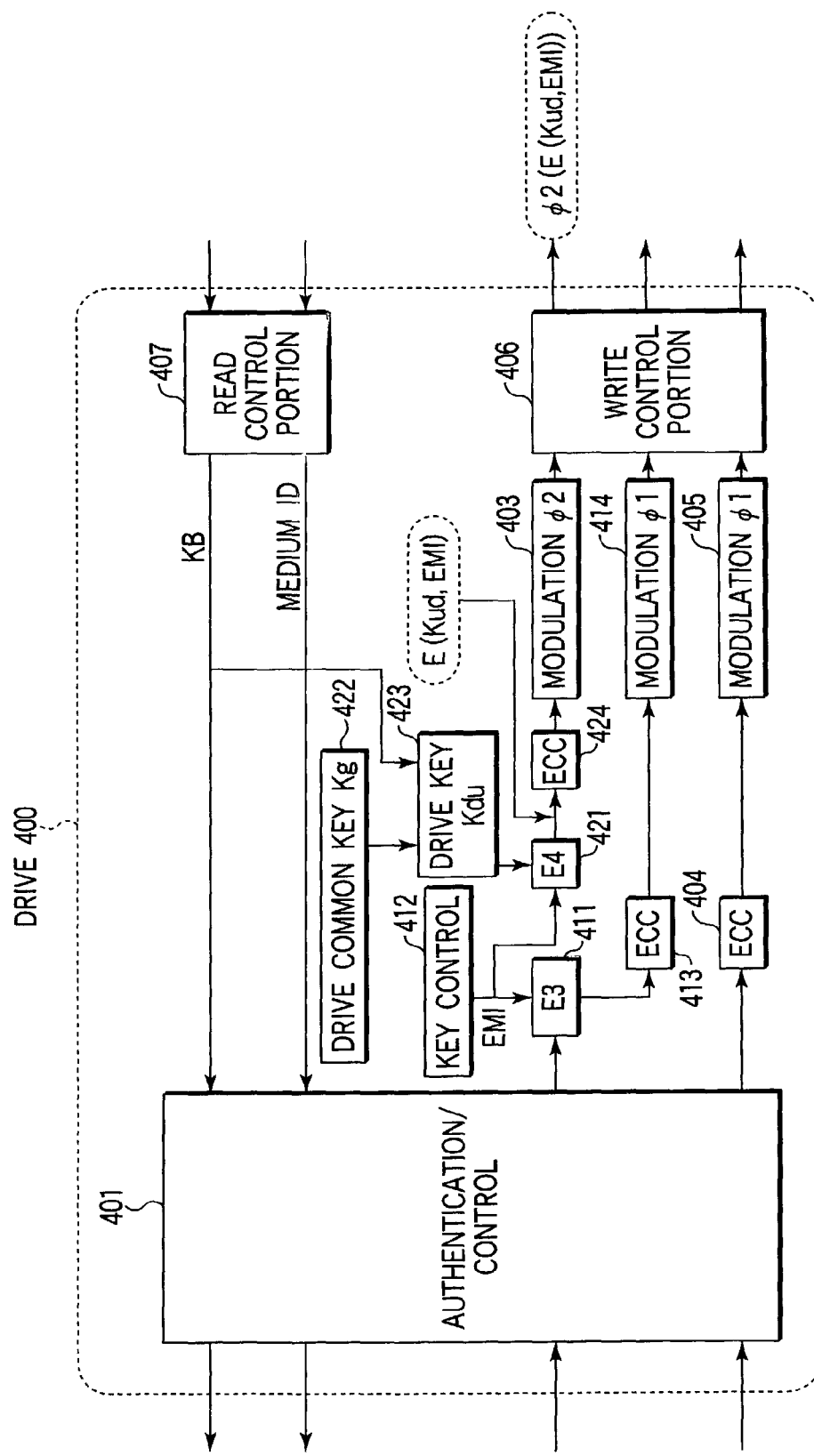
F I G. 27

METHOD AND APPARATUS FOR RECORDING INFORMATION INCLUDING SECRET INFORMATION AND METHOD AND APPARATUS FOR REPRODUCTION THEREOF

CROSS-REFERENCE TO RELATED APPLICATIONS

This application is based upon and claims the benefit of priority from the prior Japanese Patent Applications No. 2001-312983, filed Oct. 10, 2001, and No. 2001-328079, filed Oct. 25, 2001, the entire contents of both of which are incorporated herein by reference.

BACKGROUND OF THE INVENTION

1. Field of the Invention

The present invention relates to a method and an apparatus for recording information including secret information, effective for recording a content necessitating protection of copyright and a method and an apparatus for reproduction thereof.

2. Description of the Related Art

Recently, any type of information can be digitized and technology capable of distributing such information through transmission media or recording media has been developed, as expressed by the term "digital revolution." As a result, a great number of people have come to acquire digital information freely. In such an environment, signals such as digital audio signals, digital video signals, relating data which computers handle are recorded in a recording medium. Information transmission and storage are carried out so that the above-described signals are reproduced from the recording medium, information is copied to a read-only medium, transmitted information is reproduced or information is transmitted through a transmission line.

Recently, as a recording medium capable of recording a large volume of video/audio information, the digital versatile disc (DVD) has been realized. A movie over two hours long is recorded in a DVD and such DVD recorded information is reproduced through a playback apparatus, so that the movie can be watched freely at home.

DVDs are classified into: read-only DVD-ROMs, DVD-Rs which allow a one-time recording, and DVD-RW, DVD-RAM which allow re-recording.

DVD-video is a standard currently used which allows a whole movie to be recorded in a single disc. A user can acquire information based on digital signals freely through reproduction of such DVD-video discs or reception of digital broadcasting. Under such circumstances, if the acquired digital signals are copied to a recording medium such as a hard disc and the aforementioned DVD-RAM and encoded with an encoder based on the DVD-video standard, it is possible to copy a disc.

Thus, in a DVD-video, digital information to be recorded is encrypted. The copy protect method employing cryptography technology functions effectively for a DVD-video disc or DVD-ROM, in which encrypted information is pre-recorded.

In the field of such information transmission and storage processing, recently, copyright protection is gaining in importance. Particularly, if information necessitating protection of copyright is recorded on an ordinary recording medium, illegal copy needs to be prevented. That is, although an individual having a copyright permits recording of information to only a single recording medium, it is possible to illegally copy the information onto a number of recording medium, thus preventing this is of the utmost importance.

Because a rewritable or re-recordable recording medium has appeared, generation control information is needed for the content, and its control information includes "copy is prohibited," "a single copy is permitted," "copying several times is permitted" and the like.

Recently, as a concept for content control, such concepts as "move," "check-out," and "check-in" have appeared. These words are defined as follows.

(1) "Move": Moving the content from a recording area to another recording area. Consequently, the content written into an original recording area is erased.

(2) "Check-out": Copy is permitted N times or the content is copied from a recording area (or first recording medium) to another recording area (or second recording medium). The content written into an original recording area is not erased but copy control information N is reduced by one. Of course, if N=0 is reached, the content cannot be copied any more. Although usually, a copied content can be reproduced, this copied content is not permitted to be copied further.

(3) "Check-in": When the copy control information of the content in an original recording area is for example, (N−1) times, executing processing for returning that content from the other recording area recorded previously. As a result, the copy control information for controlling the content of the original recording area is increased by one, i.e., changed to N times. It follows that the content written into the other recording area is erased.

If an information recording/reproducing apparatus, which operates according to one of the above concepts is used faithfully to its function, there occurs no problem. However, the information recording/reproducing portion may be modified so that the copy control information is made meaningless. Thus, the presence of the copy control information becomes meaningless.

Technologies for blocking such illegal copy of digital signals are disclosed in Japanese Patent KOKAI Publications No. 9-128990, No. 8-204584, and No. 8-28684.

The Japanese Patent KOKAI Publication No. 9-128990 discloses a method of recording by replacing a part of an error correction code with specific information (encryption key or the like). According to this method, since a part of the digital data or the error correction code is replaced with the specific information, an error occurs in the replaced portion. Therefore, if the amount of the specific information increases, the error rate of the original data increases, which increases the load on error correction processing.

According to Japanese Patent KOKAI Publication No. 8-204584, when supplying data subjected to error correction processing to a decoding portion, a correction impossible data portion is replaced with a special code containing a synchronous code so that it can be detected by the decoding portion. The decoding portion recognizes the error portion using the special code to carry out decoding.

According to the Japanese Patent KOKAI Publication No. 8-286840, encryption is carried out by changing additional information or the position of the additional information in order to prevent illegal copying. The allocation structure of digital data is determined so as not to occur a correction impossible state of digital data due to a data error generated by embedding encryption key information.

To control the content and control information (including copy control information), encryption and decryption processing is carried out for the content and control information in the information recording/reproducing portion. However, key information for encrypting or decrypting the content or control information may be illegally removed. Consequently, decrypting of the content and control information is enabled, so that it is possible that the content is duplicated illegally into another recording medium or recording area in a large quantity and the content is decrypted.

In order to prevent such illegal copying, procedures for encryption and decryption need to be improved further. Additionally, the recording medium for recording the content or key information and the recording/reproduction method must also be improved.

BRIEF SUMMARY OF THE INVENTION

An object of the present invention is to provide a method and apparatus for recording/reproducing information in which concealability in recording or reproduction of key information is improved through use of a cheap recording medium as to prevent illegal copy of its content.

Another object of the present invention is to provide a method and apparatus for recording information including secret information, provided with a copyright protection system capable of preventing illegal copy of a recording medium in which information whose copyright is required to be protected is recorded, even in a system comprising a recording/reproducing drive in use for environment of computer or the like, and PC capable of editing information easily.

According to an embodiment of the present invention, an information recording method for recording content information in a recording medium having at least re-readable area, comprising:

converting, based on a first conversion rule $\phi 1$, first information including a first component for obtaining content control information;

converting, based on a second conversion rule $\phi 2$, second information including a second component for obtaining the first information; and writing the converted first information and the converted second information into the re-recordable area of the recording medium.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 5 is a block diagram showing recording data processing process employed in a DVD system;

FIG. 11 is a diagram showing a part of a conversion table for a modulator which is used in the DVD;

FIG. 14 is an explanatory diagram showing an example of a modulation information data block in which information modulated based on a second modulation rule $\phi 2$ is inserted;

FIG. 16 is an explanatory diagram showing another example that information modulated based on the second modulation rule $\phi 2$ is embedded in a modulated signal of main data;

FIG. 17 is an explanatory diagram showing still another example that information modulated based on the second modulation rule $\phi 2$ is embedded in a modulated signal of main data;

FIG. 24 is an explanatory diagram for information in the re-recordable area and re-record disable area of the recording medium (disc) for recording or reproducing information with the apparatus shown in FIGS. 22 and 23;

FIG. 27 is a diagram showing the block structure of a drive according to a still further embodiment of the present invention.

DETAILED DESCRIPTION OF THE INVENTION

A method and apparatus for recording information including secret information and a method and apparatus for reproduction thereof will be now described with reference to the accompanying drawings.

First Embodiment

Figure 1A:
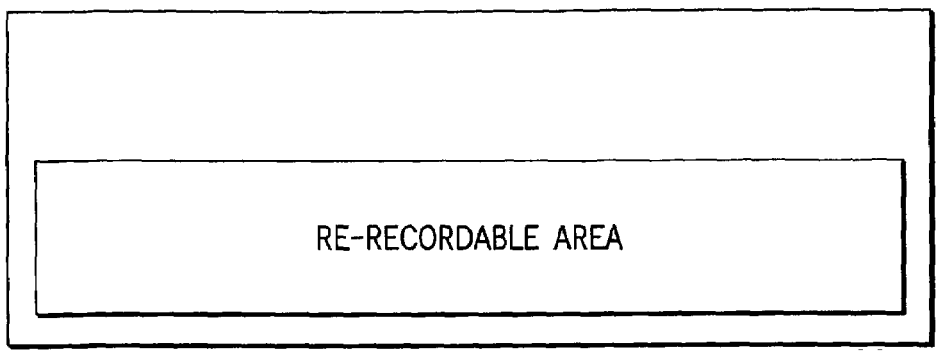
FIGS. 1A and 1B are diagrams for explaining the types of recording media.
Figure 1B:
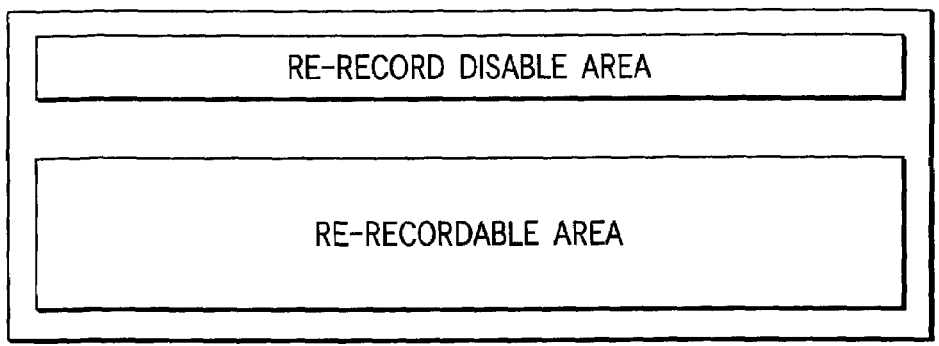

In recent years, various kinds of recording media have been marketed, and are classified described below. FIG. 1A shows an area of a recording medium called type 0. Most of the recording medium includes a area which information can be recorded on or reproduced from. This media includes video tapes, semiconductor memory (RAM), floppy discs and the like. FIG. 1B shows an area of a recording medium called type 1, which is represented by, for example, an optical disc and a semiconductor memory (RAM) loaded with a nonvolatile memory. The recording medium of type 1 has a re-record disable area (read-only area) and a re-recordable area. Medium 1D (disc identification information), key group information KB which is a bundle of keys (master key encrypted with the key of each device) and the like are written into the re-record disable area. The medium ID and information KB are available as a part (namely, a part for generating the key) of a key for encrypting the content.

If the medium ID or key group information KB, which is a bundle of keys is recorded in the recording medium of type 0, there is no way but recording in its re-recordable area. Therefore, there is a fear that the medium ID or key group information KB may be easily stolen or rewritten. Thus, the recording media of type 0 is not suitable for recording content necessitating protection of copyright.

Next, the recording medium of type 1 will be considered. In type 1, the medium ID and key group information KB, which is the bundle of keys, are written into a re-record disable area which enables read-out but disables write-in. Therefore, the medium ID and key group information KB are never rewritten without permission. If the medium ID and the key group information KB are used as a part of a key for encrypting content, a recording medium (first recording medium) and a recording content correspond to each other one to one. That is, even if only the content (all data in the re-recordable area) is copied to another recording medium (second recording medium), signals reproduced from the second recording medium cannot be decrypted accurately because the medium ID and key group information KB of the other recording medium (second recording medium) are different from the medium ID and key group information KB of the first recording medium in terms of the content.

How the "move," "check-out," and "check-in" previously described in (1), (2), and (3) are carried out using the recording medium of type 2 will be described.

(1) "Move": Moving the content from a recording area (for example, first recording medium) to another recording area (second recording medium). Consequently, the content written into an original recording area is erased.

Thus, in this case, control information for the "move" processing permission is recorded in the recording medium. If the content is moved from the first recording medium to the second recording medium, the control information for the "move" processing permission or content to be recorded in the first recording medium is erased or rewritten with meaningless data.

(2) "Check-out": Copy is permitted N times or the content is copied from a recording area (first recording medium) to another recording area (second recording medium). The content in an original recording area is not erased but copy control information is reduced to (N−1) times. Of course, if N=0 is reached, the content cannot be copied any more.

In this case, the copy control information needs to be so designed to be changeable, so that the copy control information can be written into the re-recordable area of the first recording medium.

(3) "Check-in": When the copy control information of the content in an original recording area is for example, (N−1) times, executing a processing for returning that content from the other recording area recorded previously. As a result, the copy control information for controlling the content of the original recording area is changed to N (=(N−1)+1) times. Thus the content written into the other recording area is erased.

Thus, in this case also, the copy control information needs to be so designed to be changeable, so that the copy control information can be written into the re-recordable area of the first recording medium.

Encryption/decryption processing is carried out to the content and copy control information (administration information). However, key information for encrypting/decrypting the content and administration information may be illegally stolen.

Thus, according to the method of an embodiment of the present invention, the key information which encrypts the content and administration information is also encrypted and written into the re-recordable area. Because the encrypted key information is written into the re-recordable area, the encrypted key information may be rewritten illegally. Thus, the second key information (random number), which encrypts the key information is also encrypted and recorded in the re-recordable area.

According to the embodiment of the present invention, the encrypted key information is written into the re-recordable area such that the encrypted key information can be written into and read-out from the based on the first conversion/inverse-conversion rule like the encrypted content and administration information and the encrypted second key information is written into the re-recordable area such that the encrypted second key information can be written into and read-out from the based on the second conversion/inverse-conversion rule. The second conversion/inverse-conversion rule executes conversion/inverse-conversion inside an information recording/reproducing apparatus. That is, information affected by the second conversion/inverse-conversion rule is protected from being introduced out of the information recording/reproducing apparatus. As a result, the encrypted second key information, which is to be recorded/reproduced based on the second conversion/inverse-conversion rule, has a very high concealability.

Figure 2:
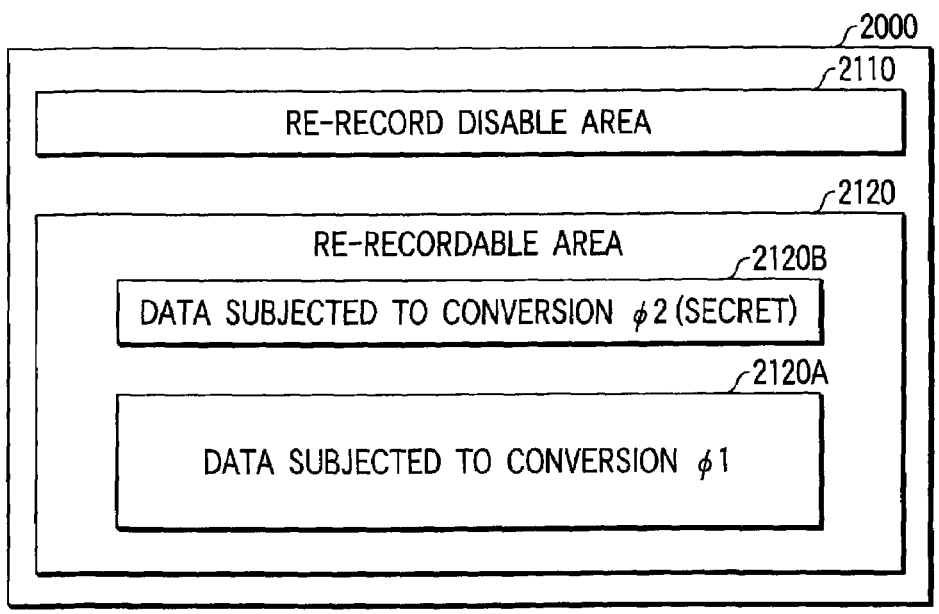
FIG. 2 is an explanatory diagram of the content of information recorded in a recording medium of an embodiment of the present invention.

FIG. 2 is an explanatory diagram showing areas in a recording medium for recording/reproduction based on the method of the present invention and its internal information.

A re-record disable area 2110 and a re-recordable area 2120 are secured in a recording medium 2000. The re-record disable area 2110 comprises medium ID (for example, identification number inherent of disc) and the re-recordable area 2120 comprises a first type conversion (φ1) data recording area 2120A and a second type conversion (φ2) data (concealability) recording area 2120B.

Encrypted content information and encrypted copy control information are recorded in the first type conversion (φ1) data recording area 2120A as described in detail later. The key information, which encrypts the copy control information, is recorded in the second type conversion (φ2) data recording area 2120B.

Figure 3A:
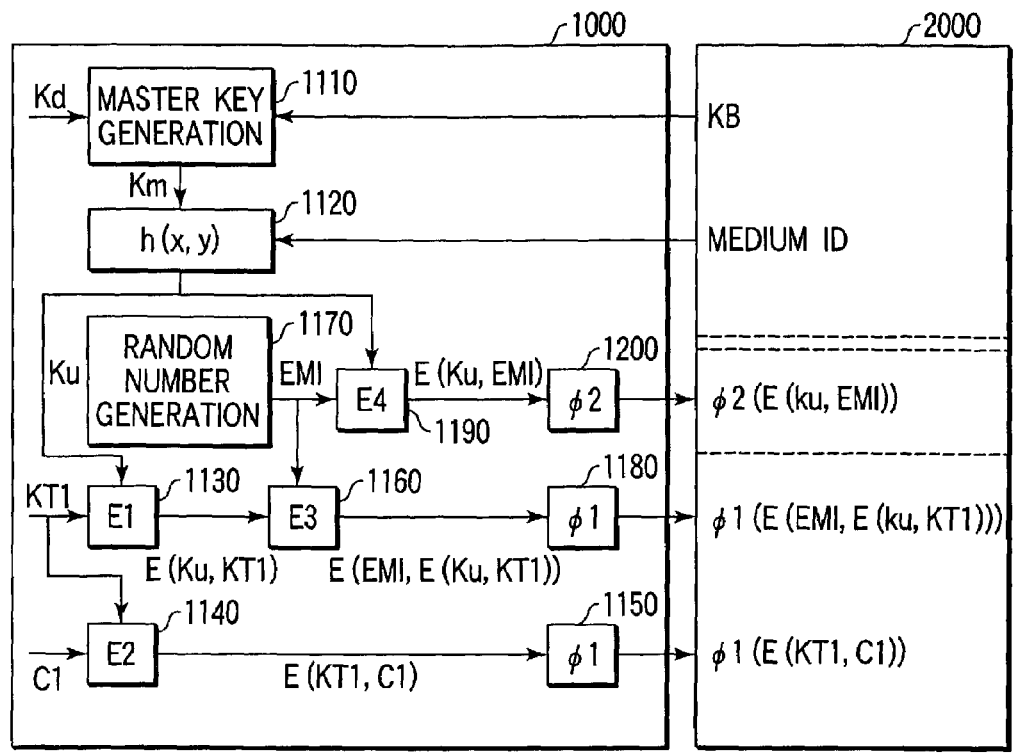
FIGS. 3A and 3B are explanatory diagrams showing the information recording structure block of an apparatus according to the embodiment of the present invention.
Figure 3B:
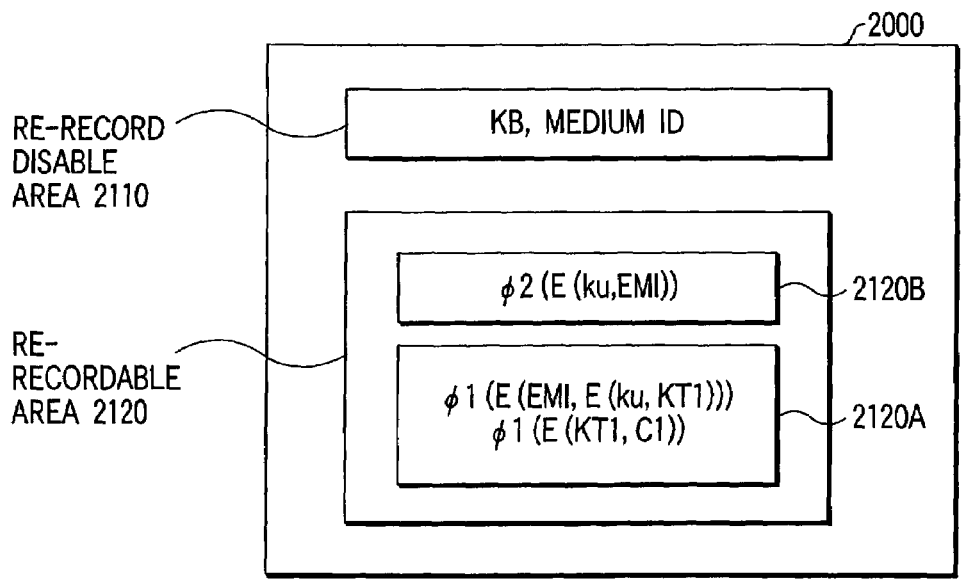

FIG. 3A shows an information recording/reproducing apparatus 1000 employing the recording method of the present invention and FIG. 3B shows the recording medium 2000. The information recording apparatus 1000 has a master key generation portion 1110. The master key generation portion 1110 generates a master key Km from key group information KB read from the recording medium 2000 and information Kd (usually called a device key) possessed by the recording apparatus 1000. The master key Km is input to a 2-variable converter 1120. The 2-variable converter 1120 processes the medium ID inherent of a disc and the master key Km with 2-variable function h(x, y) so as to generate a medium inherent key Ku.

The medium inherent key Ku and title key KT1 (corresponding to the title of content C1) are input to an encryption portion 1130. The encryption portion 1130 encrypts the title key KT1 using the medium inherent key Ku so as to obtain encrypted title key E(Ku, KT1).

The encrypted title key E(Ku, KT1) is input to the encryption portion 1160. The encryption portion 1160 encrypts the encrypted title key E(Ku, KT1) using a random number EMI from a random number generator 1170 so as to obtain a double encrypted title key E(EMI, E(Ku, KT1)). The double encrypted title key E(EMI, E(Ku, KT1)) is converted by a converter 1180 for carrying out data conversion according to the conversion rule φ1 and recorded in the re-recordable area of the recording medium 2000 as a converted double encrypted title key φ1(E(EMI, E(Ku, KT1)).

The title key KT1 encrypts the content C1 through an encryption portion 1140. The encrypted content E(KT1, C1) is converted by a converter 1150 having the conversion rule φ1 and recorded in the re-recordable area of the recording medium 2000 as converted encrypted content φ1 (E(KT1, C1)).

Further, a random number EMI from a random number generator 1170 is input to an encryption portion 1190, encrypted by the medium inherent key Ku and output as an encrypted random number E(Ku, EMI). The encrypted random number E(Ku, EMI) is converted by a converter 1200 having the conversion rule φ2 and output as converted encrypted random number φ2(E(Ku, EMI)). The converted encrypted random number φ2(E(Ku, EMI)) is recorded in the re-recordable area of the recording medium 2000.

FIG. 3B shows information recorded in the recording medium 2000 through the above-described recording processing. A re-record disable area 2110 and re-recordable area 2120 are provided in the recording medium 2000. The re-record disable area 2110 comprises medium ID (for example, identification number inherent of disc). The re-recordable area 2120 comprises the first type conversion (φ1) data recording area 2120A and the second type conversion (φ2) data (secret) recording area 2120B.

The converted encrypted random number φ2(E(Ku, EMI)) is recorded in the second type conversion (φ2) data recording area 2120B and the converted double encrypted title key φ1(E(EMI, E(Ku, KT1))) and the converted encrypted content φ1(E(KT1, C1)) are recorded in the first type conversion (φ1) data recording area 1210A.

Figure 4:
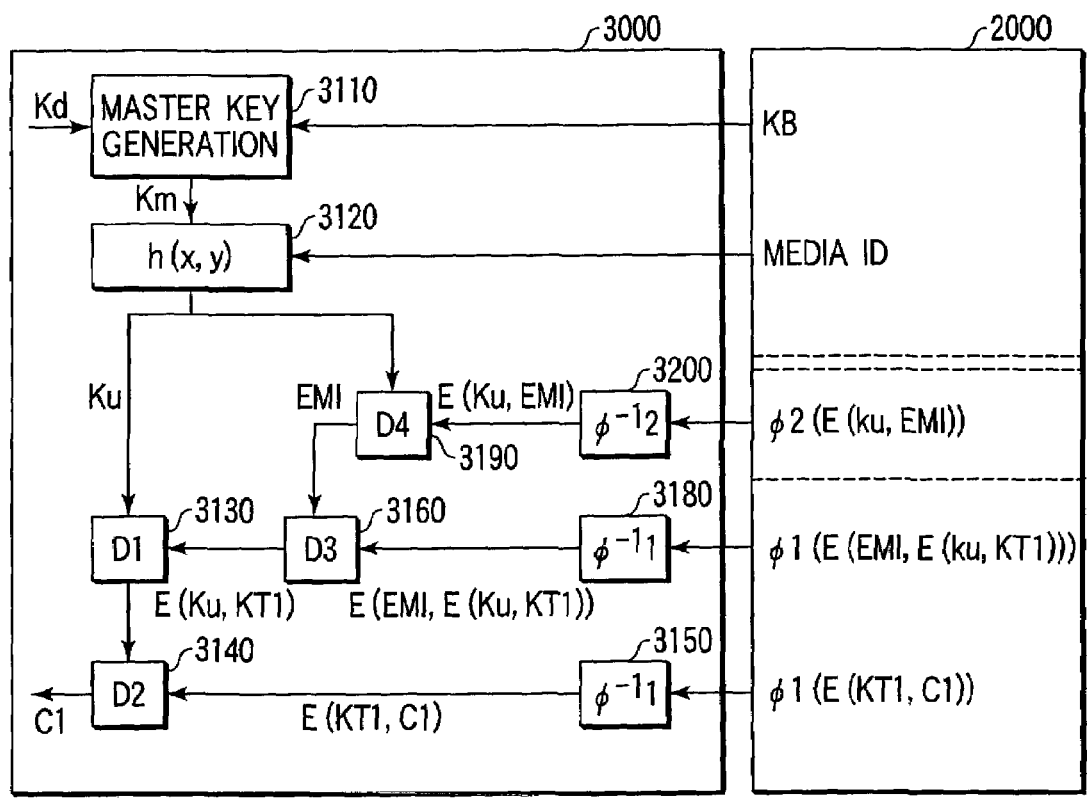
FIG. 4 is an explanatory diagram showing the information reproduction structure block of an apparatus according to the embodiment of the present invention.

FIG. 4 shows an apparatus for reading and decrypting information in the recording medium 2000, recorded in the above-described manner.

An information reproducing apparatus 3000 has a master key generation portion 3110. The master key generation portion 3110 generates a master key Km from key group information KB read from the recording medium 2000 and information Kd (usually called device key) possessed by the information reproducing apparatus 3000. The master key Km is input to a 2-variable converter 3120. The 2-variable converter 3120 processes the medium ID inherent of disc and the master key Km with 2-variable function h(x, y) so as to generate a medium inherent key Ku.

The medium inherent key Ku acquired here is the same as the medium inherent key Ku shown in FIG. 3A. The reason is that if the content of the key group information KB shown in FIG. 3A is the same as that of the medium ID, the relation between the key group information KB and the device key Kd is devised so as to obtain the same content as in FIGS. 4 and 3A for the medium inherent key Ku. That is, information corresponding to the device key Kd is contained in the key group information KB. In an illegal apparatus, because no information corresponding to the device key Kd is contained in the key group information KB, no correct master key Km is acquired, and consequently, no correct medium inherent key Ku is acquired. If any illegal apparatus is found, a disc provider deletes information corresponding to that illegal apparatus from the key group information KB for next sale. As a result, distribution of illegal copies can be prevented.

The converted encrypted random number φ2((Ku, EMI)) read from a disc 2000 is input to a converter 3200 having an inverse-conversion rule φ$^{-1}$2 of the conversion rule φ2 and inversely converted, and then decrypted to the encrypted random number E(Ku, EMI). Then, the encrypted random number E(Ku, EMI) is decrypted by a decryption portion 3190 using the device inherent key Ku, so that the random number EMI is acquired.

The converted double encrypted title key φ1(E(EMI, E(Ku, KT1))) and converted encrypted content φ1(E(KT1, C1)) read from a disc are input to converters 3180 and 3150 having an inverse-conversion rule φ$^{-1}$1 of the conversion rule φ1 and inversely converted so as to acquire the double encrypted title key (E(EMI, E(Ku, KT1)) and the encrypted content E(KT1, C1).

The double encrypted title key (E(EMI, E(ku, KT1)) is decrypted by a decryption portion 3160 using the random number EMI so as to acquire the encrypted title key E(Ku, KT1). Further, the encrypted title key E(Ku, KT1) is decrypted by a decryption portion 3130 using the previous medium inherent key Ku so as to acquire the title key KT1.

The encrypted content E(KT1, C1) is decrypted by a decryption portion 3140 using the title key KT1.

As for the relation between the conversion rule φ1 and the conversion rule φ2, even if the component X provided by conversion based on the conversion rule φ2 is inversely converted according to the inverse-conversion rule φ$^{-1}$1, the component X is not obtained. That is, it is natural that the relation satisfying φ$^{-1}$1(φ2(X))≠X exists. Thus, even if the entire re-recordable area is backed up or restored to execute illegal copy of the content, no apparatus but an authenticate recording/reproducing apparatus can decode the content correctly.

By generating a medium inherent key Ku with a random number generator instead of generating the medium inherent key Ku from the key group information KB, device key Kd, and medium ID, a medium having only a re-recordable area as shown in FIG. 1A can contain the same content concealability function as a medium having a reading only area (re-record disable area) and a re-recordable area (reading and recording enable area).

According to this embodiment, concealability of administration information is improved as described above. The reason is that the control information is encrypted and the key information which encrypts the control information is also encrypted. For the encrypted control information (first information) and encrypted key information (second information), one conversion rule is $\phi 1$ while the other conversion rule is $\phi 2$. Further, processings based on the conversion rule $\phi 2$ and inverse-conversion rule $\phi^{-1}2$ are executed inside the apparatus. Thus, if the copy control information ("check-out" and "check-in" information) is included in the administration information, no one can rewrite the content of the copy control information, or steal it. In the meantime, the conversion and inverse-conversion may be carried out in various ways, including conversion of channel bit, modulation, addition or subtraction of specific data and the like.

According to this embodiment, as described above, concealability in recording or reproduction of key information is improved through use of a cheap recording medium as to prevent illegal copy of its content.

Other embodiments of the present invention will be described. The same portions as those of the first embodiment will be indicated in the same reference numerals and their detailed description will be omitted.

Second Embodiment

[I: Example of System in which the Embodiment of the Present Invention Functions Effectively]

FIG. 5 shows signal processing in a recording medium in a copyright protecting system for a DVD-video signal. In data control processing, a video/audio information signal is compressed using MPEG, or the like, and further formatted to a digital data stream having a reproduction control signal or the like added thereto (step S1).

Digital data is divided into sectors of packet data each having the unit of "2K bytes" (step S2) and an ID which is a sector number is attached to each sector (step S3). Next, data is encrypted (data scramble) (step S4). An error detecting code EDC is attached to the encrypted data (step S5). A data portion is scrambled according to a code determined by ID information so as to stabilize the servo system in reproduction operation (step S6).

The data scramble here is different from the data scramble for the above-described encryption, so that data is scrambled with open contents. If digital data is "all 0" or in similar case, recording data turns to be repetition of same pattern. In this case, a disc system may have a problem in that a tracking servo error signal cannot be detected accurately, due to cross-talk of an adjacent track. The initial value of an M system generator is determined by an ID value. By multiplying a signal from the M system generator with digital data, data scramble is carried out. This prevents the scrambled recording signal from being a repetition of same pattern. In this specification, the "data scramble" used for servo stabilization will not be described any more but the "data scramble" described elsewhere in this specification indicates that used for encryption processing for protection of copyright of information.

The digital data subjected to the above-described processing is converted to blocks based on the error correction code ECC so as to execute error correction processing for every 16 sectors (step S7), and error correction codes of an inner-code parity PI and an outer-code parity PO are generated (step S8).

The outer-code parity PO is distributed in each sector by interleave processing so that a recording sector is constructed (step S9). The recording sector data is modulated through a modulating circuit (step S10) and the modulated signals are recorded by cutting an original disc through a driver and a pickup device. FIG. 5 shows the same structure as a marketed recording/reproducing apparatus whose pickup portion has a different power.

Based on the original disc, a disc manufacturing mold is produced through a disc manufacturing process and then, a large number of discs are copied using an injection machine and provided to the market as a DVD-ROM disc in which video signals are recorded.

Figure 6:
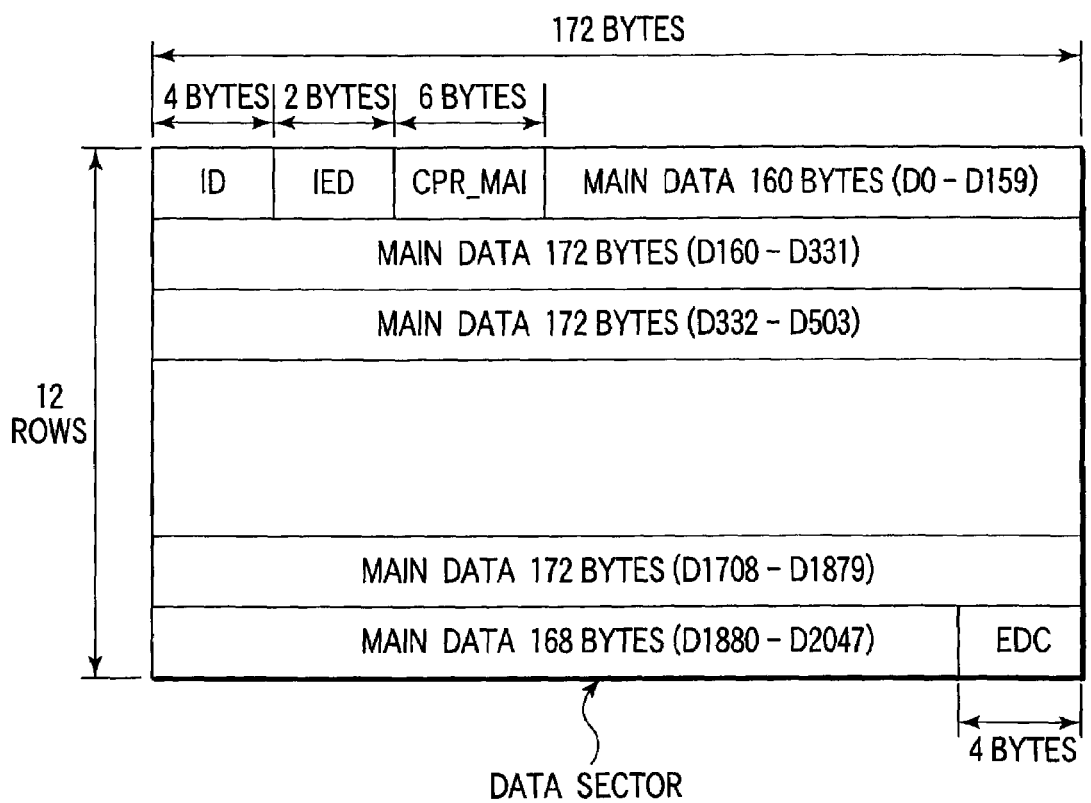
FIG. 6 is an explanatory diagram showing the structure of a data sector employed in the DVD system.

FIG. 6 shows the structure of the data sector of FIG. 5.

The data sector is constituted of 172 bytes (=1 row)×12 rows and sector identification information ID comprised of a sector number and sector information is disposed at the head row, followed by an ID error detecting code IED, information concerning protection of copyright CPR_MAI, a 2-K byte main data area and finally an error detecting code EDC for main data.

Figure 7:
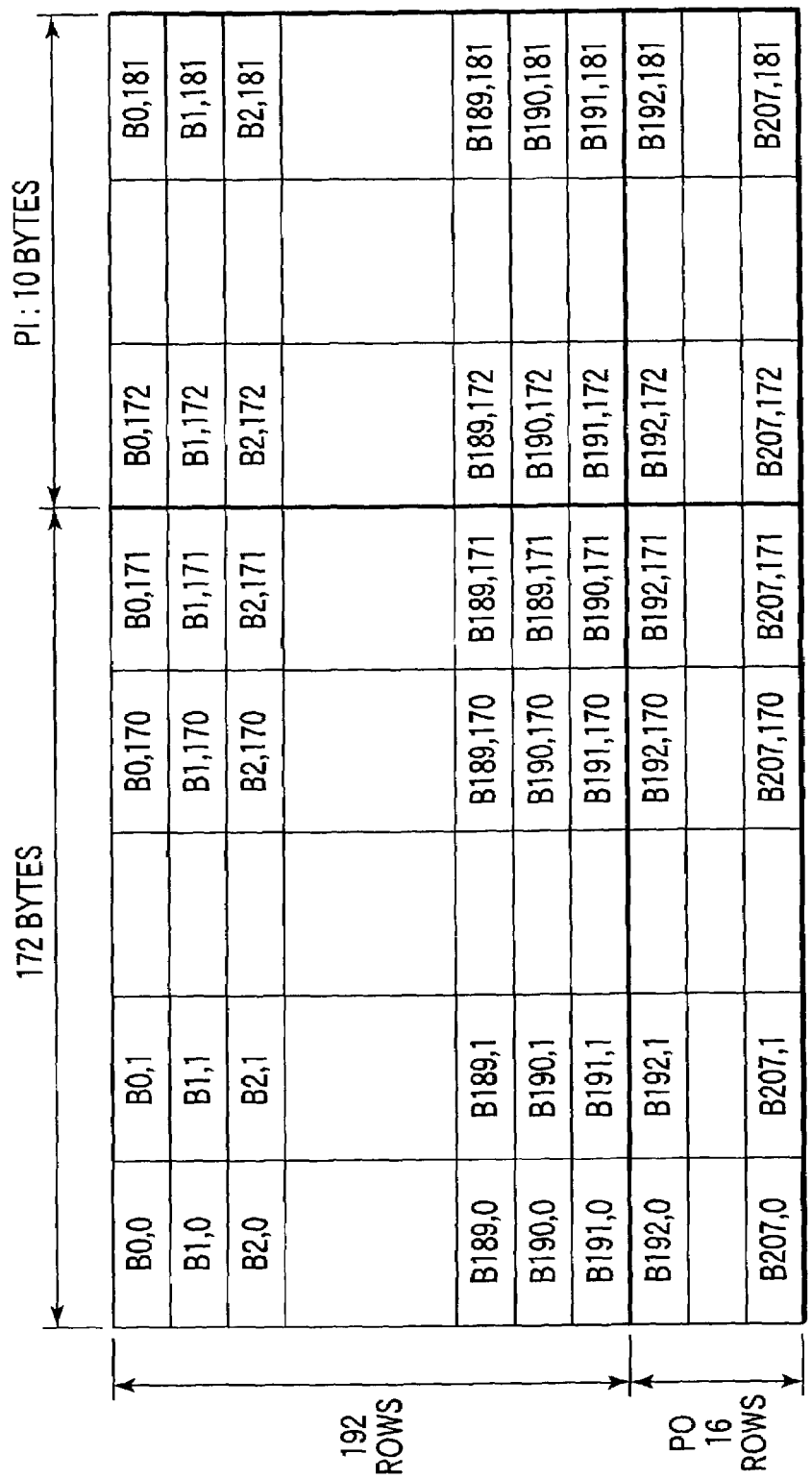
FIG. 7 is an explanatory diagram showing the structure of an ECC block employed in the DVD system.

FIG. 7 shows the structure of the ECC block. In data of 172 bytes×192 rows constituted by gathering 16 of the data sectors in FIG. 5, the outer-code parities POs of 16 bytes (16 rows) are generated to each column (vertical direction) while the inner-code parities PIs of 10 bytes (10 columns) are generated to each row (lateral direction). Here, the outer-codes PO of 16 rows (16 bytes) are distributed such that a row (172 bytes) is interleaved for every 12 rows (each sector).

Figure 8:
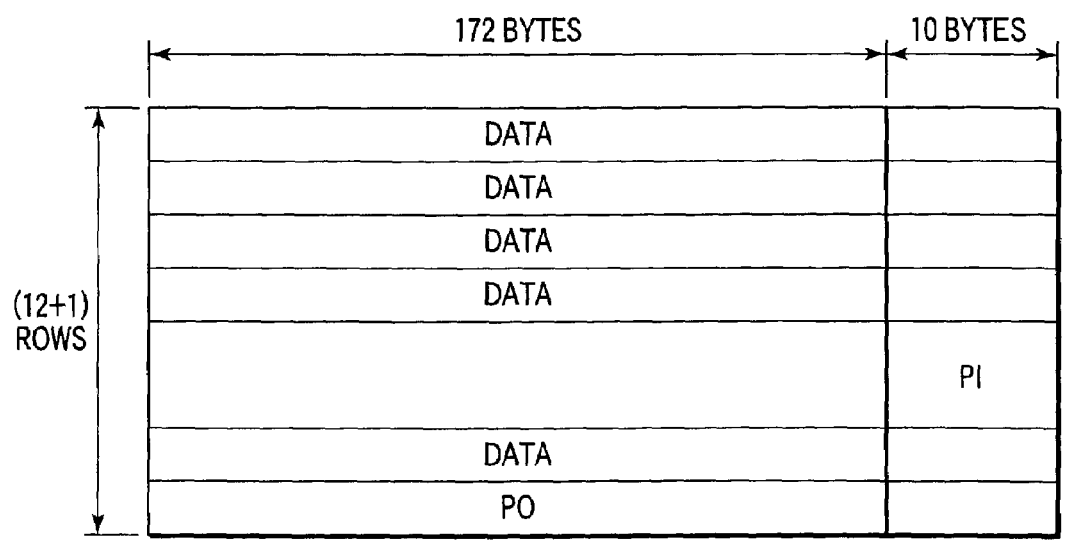
FIG. 8 is an explanatory diagram showing the structure of a recording sector employed in the DVD system.

FIG. 8 shows the structure of a sector picked out from respective sectors after the outer-codes POs are interleaved. This is called a recording sector. (12+1) rows are provided because a part (a single row) of the outer-code parities POs is added to the sector (12 rows) shown in FIG. 6.

Figure 9:
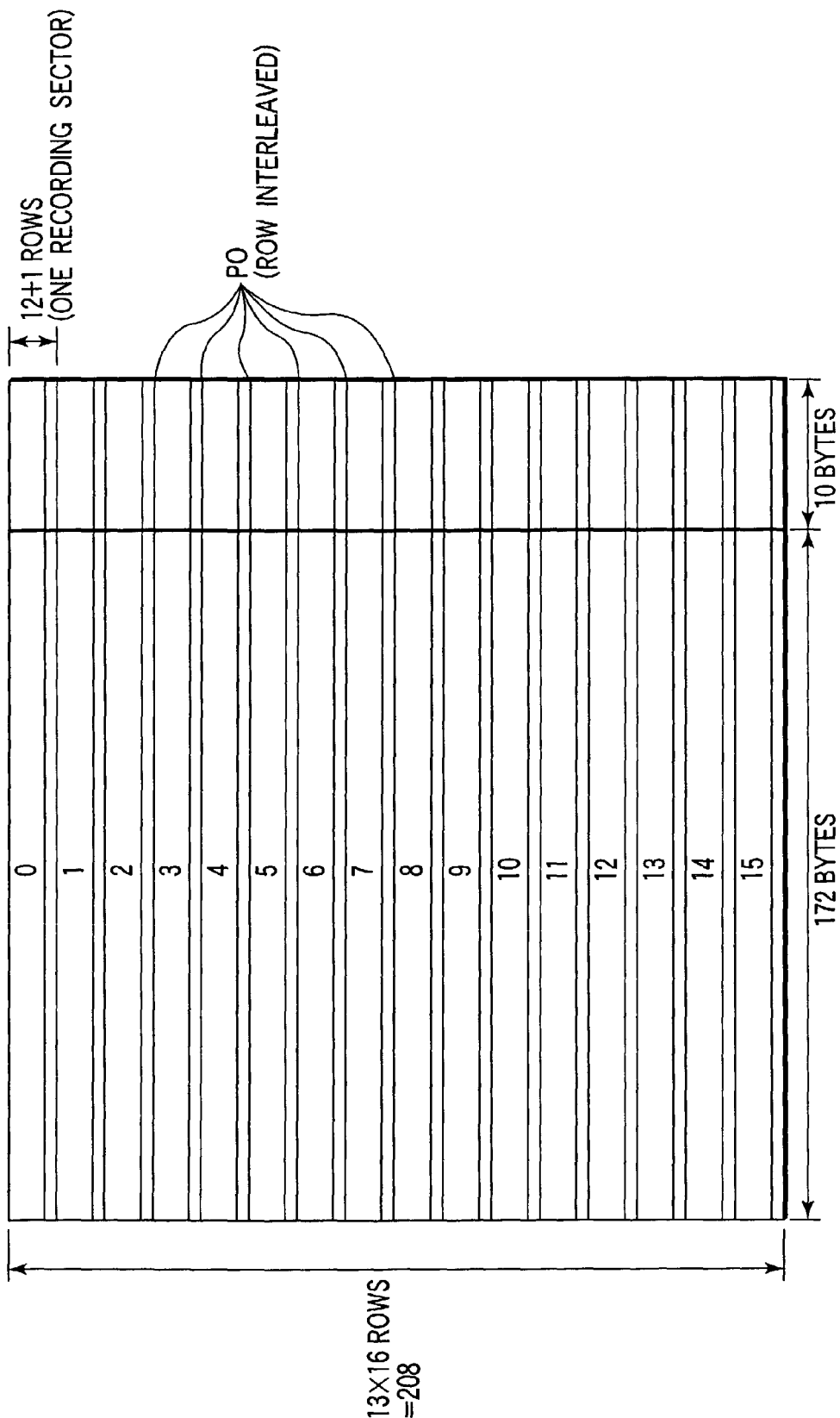
FIG. 9 is an explanatory diagram showing the structure of the ECC block after row interleave processing employed in the DVD system.

FIG. 9 shows the structure of the ECC block comprised of 16 recording sectors. That is, 16 of the recording sector shown in FIG. 8 are gathered.

Figure 10:
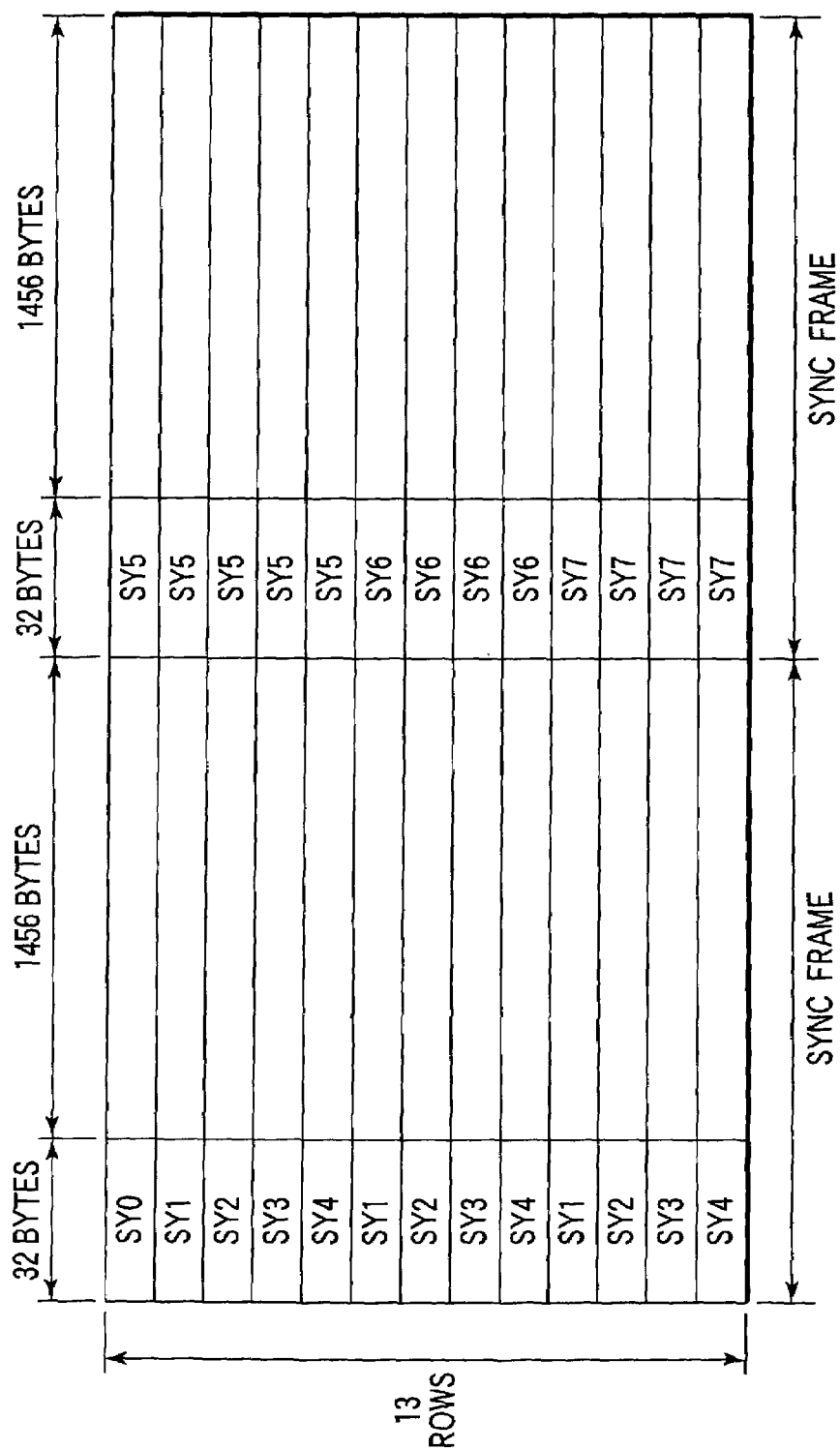
FIG. 10 is an explanatory diagram showing the structure of a physical sector employed in the DVD system.

FIG. 10 shows the structure of a physical sector generated by passing data stream of each recording sector through a modulator.

The modulator code-modulates each data symbol (1 byte=8 bits) to 16 channel bits. FIG. 11 shows a part of a code conversion table for the modulator used in the DVD standard. When code-modulating of data symbol is carried out, synchronous signals (sync SY0 to sync SY7) are attached to the head and intermediate position of each row of the recording sector. The syncs are disposed such that combination of sync patterns differs depending on each row and the position in row of each sector can be found depending on the combination of the sync patterns upon reproduction processing.

As shown in FIG. 10, a pair of sync frames of (32+1456) channel bits constructs a single row. For example, at the first row of FIG. 10, SY0 and SY5 are sync frames. Gathering 13 of such row constructs the physical sector.

In such a DVD, protection on information is carried out for video signals to be recorded in a ROM disc specialized for reproduction as copyright protection system. In this case, a copy protection system called a content scramble system (CSS) is employed as the copyright protection system. However, the copy protection system is not a complete system. If the total data of a disc is backed up and restored, such a high level control as "check-in" processing cannot be carried out.

FIG. 11 shows a part of the modulation type code conversion table used for the DVD standard. Because the DVD uses the relation of data symbol=1 byte (8 bits), code words each of 16 channel bits are allocated to 256 data symbols from "0" to "255". In the code word of 16 channel bits, the distance from "1" to next "1" is in a range of 3 to 11 bits. When a code word is connected to another code word also, the distance from "1" to next "1" is in a range of 3 to 11 bits. For the reason, four tables, State-1 to State-4 are prepared for each data symbol. As for each code word to be used upon modulating the data symbol, the state (or table) in which a code word to be used next exists is determined preliminarily.

As for the modulation method, in channel bit data formed as a result of selection from the code word of the modulation table, the polarity of the recording signal is inverted according to the Non-Return to Zero Inverse conversion (NRZI) method when the code word is "1." As a result of the inversion, in the recording signal, its continuous "1" is in a range of 3 to 11, while its continuous "0" is in a range of 3 to 11.

[II: Problem which Attention is Paid to]

Figure 12:
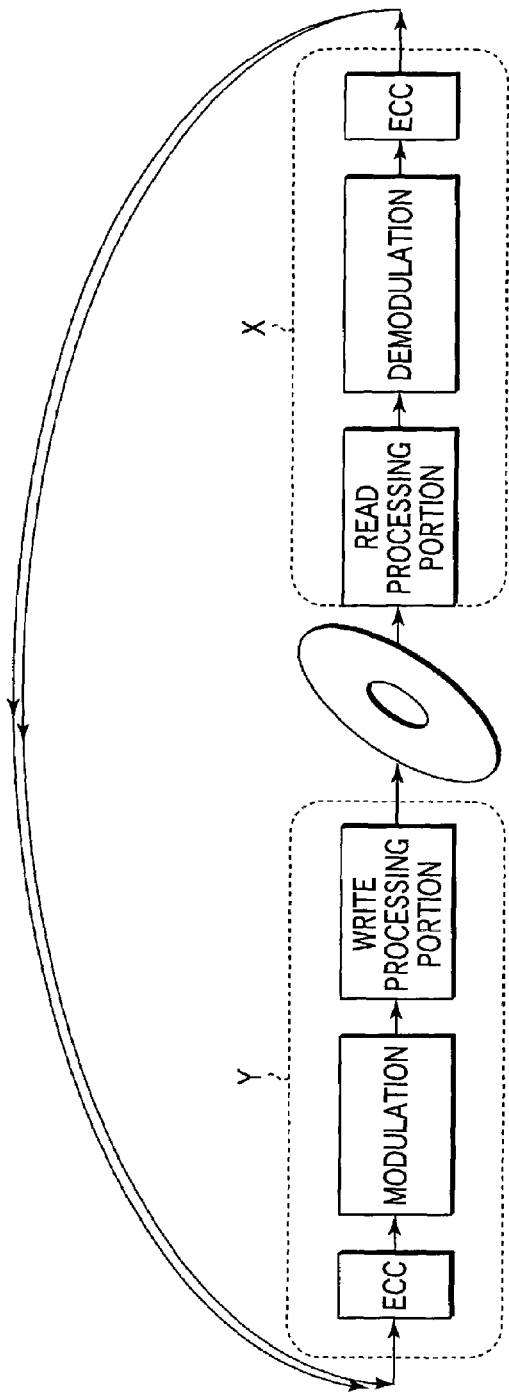
FIG. 12 is an explanatory diagram showing an example of data flow in case where illegal copy is executed.

FIG. 12 shows a case for copying an entire disc or an example of a process for illegal copy. Generally, the recording/reproducing drive used in a computer does not discriminate the contents (contents of information and control code for information and the like) recorded in a medium because it aims at recording/reproducing information according to an instruction sent from a PC. For the reason, read out data is open.

If all data read out by a reproducing drive X is recorded in the order of read-out by a recording drive Y as shown in FIG. 12, a plurality of recorded recording media are produced. Basically, the drive comprises an ECC processing portion, a modulating portion, a write processing portion and a read processing portion.

[III: Example of Recording Medium]

Figure 13:
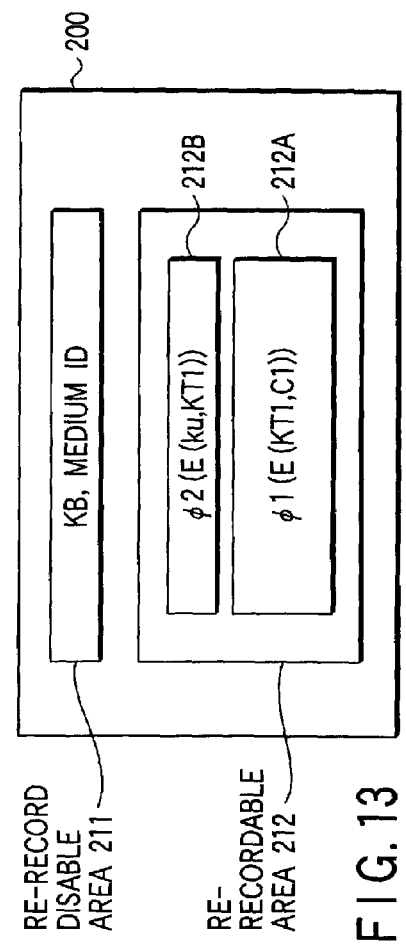
FIG. 13 is an explanatory diagram of a re-recordable area and a re-record disable area in the recording medium (disc)

FIG. 13 is an explanatory diagram showing an area in the recording medium in which information is recorded or reproduced and its internal configuration. The recording medium 200 comprises a re-record disable area 211 and a re-recordable area 212. The re-record disable area 211 stores key group information KB and medium ID (for example, identification number inherent of disc) and the re-recordable area 212 stores a first type modulation ($\phi$1) data recording area 212A and a second type modulation ($\phi$2) data (concealability) recording area 212B.

As described in detail later, the modulated encrypted content information $\phi$1(E(KT1, C1)) obtained by modulating the encrypted content information according to the first modulation rule $\phi$1 is recorded in the first modulation rule ($\phi$1) data recording area 212A. Further, modulated encrypted key information $\phi$2(E(Ku, EMI)) obtained by modulating the encrypted key information according to the second modulation rule $\phi$2 is recorded in the second modulation rule ($\phi$2) data recording area 212B. That is, the modulated encrypted content information $\phi$1(E(KT1, C1)) and the modulated encrypted key information $\phi$2((Ku, EMI)), which is obtained according to different modulation methods, is recorded in the re-recordable area 212.

[IV: Example of allocation of first modulation rule ($\phi$1) signal and second modulation rule ($\phi$2) signal]

FIG. 14 shows an example of a recording area in the physical sector of the modulated encrypted content information $\phi$1(E(KT1, C1) and the modulated encrypted key information $\phi$2((Ku, EMI)).

In the DVD system, as described in FIG. 10, an ECC block (physical sector) after the modulation is built up. According to this embodiment, a part or all portions (portion indicated with oblique lines) of a specific frame in a specific physical sector is replaced with the modulated key information $\phi$2((Ku, EMI) generated according to the second modulation rule $\phi$2. In this example, frames which synchronous codes SY2, SY5, SY3 and SY7 are to be attached are replaced.

Although an error occurs on the main data side, an increase of errors in a range which can be corrected is no problem. Although the initial position in the physical sector is specified as a place in which the second modulation rule $\phi$2 signal is embedded, it is possible to write a position signal with specific information into a previous place for subsequent positions so that that position is not seen from outside.

FIGS. 15 to 18 show various examples of a method of embedding a modulated signal generated by the second modulation rule $\phi$2.

Figure 15:
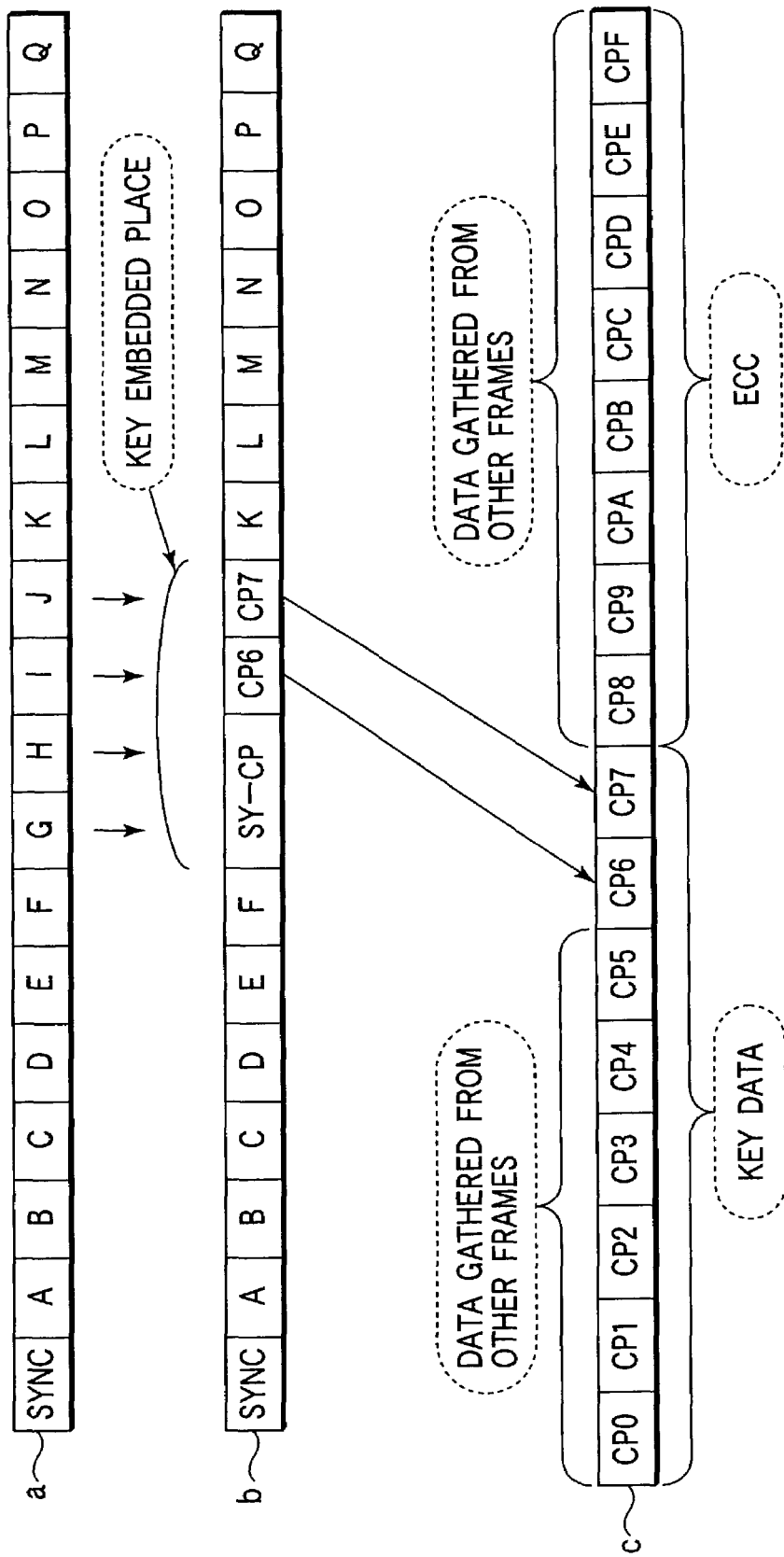
FIG. 15 is an explanatory diagram showing an example that information modulated based on the second modulation rule $\phi 2$ is embedded in a modulated signal of main data.

FIG. 15 is a diagram showing a first example of encrypted key embedding technology. A special pattern not used in main data modulation is embedded in a part (portions of G, H, I, J) of a specific frame (symbol "a") in FIG. 15 as a synchronous signal SY-CP for encrypted key embedding position and subsequently, parts of an encrypted key of several data symbols CP6 and CP7 are embedded (symbol b). If parts of these encrypted keys are extracted from other frames and gathered, the entire encrypted key can be acquired as indicated by symbol c. An error correction code ECC is attached to the encrypted key data so as to improve data reliability. That is, the encrypted key information is handled as an object for error symbol correction, so that an ultimate accurate encrypted key information can be restored.

In this case, the encrypted key information data may be modulated using the first modulation rule $\phi$1. The special pattern SY-CP exists in a data area if it is viewed from the main data area so that it becomes error data. Therefore, even if the SY-CP is demodulated ($\phi^{-1}$1) corresponding to the first modulation rule $\phi$1 and then modulated according to the first modulation rule $\phi$1, the same SY-CP pattern is not acquired. As a result, the synchronous code SY-CP disappears in a copy disc. Consequently, the SY-CP disappears, thereby disabling to extract the encrypted key so that creation of an illegal copy disc is disabled.

FIG. 16 is a diagram showing a second example of encrypted key embedding technology. In the physical sector, the main data is allocated in 16 channel bits subsequent to a synchronous signal SYNC. A predetermined channel bit or 8-channel bit dummy data 20D is disposed subsequent to the synchronous code SYNC and encrypted key parts are embedded succeeding to the dummy data 20D.

That is, the symbol division points are made different between the main data and the encrypted key, so that the modulated encrypted key information is not correctly demodulated by demodulation ($\phi^{-1}$1) corresponding to the first modulation rule $\phi$1.

In order to correctly decrypt the key information, the modulated encrypted key information is processed by modulation ($\phi^{-1}2$) corresponding to the second modulation rule $\phi 2$. If the dummy portion 20D is known preliminarily, the subsequent key data may be correctly demodulated.

FIG. 17 is a diagram showing a third example of the modulated encrypted key information. According to the code conversion table for DVD modulation shown in FIG. 11, an 8-bit data symbol is converted to a 16-channel bit. If the bit distance from "1" to next "1" in the channel bit is restricted to 3 to 11 bits, another conversion table cannot be constructed without using a pattern used in the one conversion table.

If a data symbol (8 bits) is converted to modulation channel bits based on the second modulation rule $\phi 2$, it is constructed with a larger channel bit. In this case, conversion tables corresponding to modulation and demodulation are provided on modulation and demodulation sides.

FIG. 17 shows an example that an 8-bit data symbol is converted to a larger bit, for example, 24-channel bits. Such a bit conversion enables demodulation of the encrypted key information through only a correct apparatus.

Figure 18:
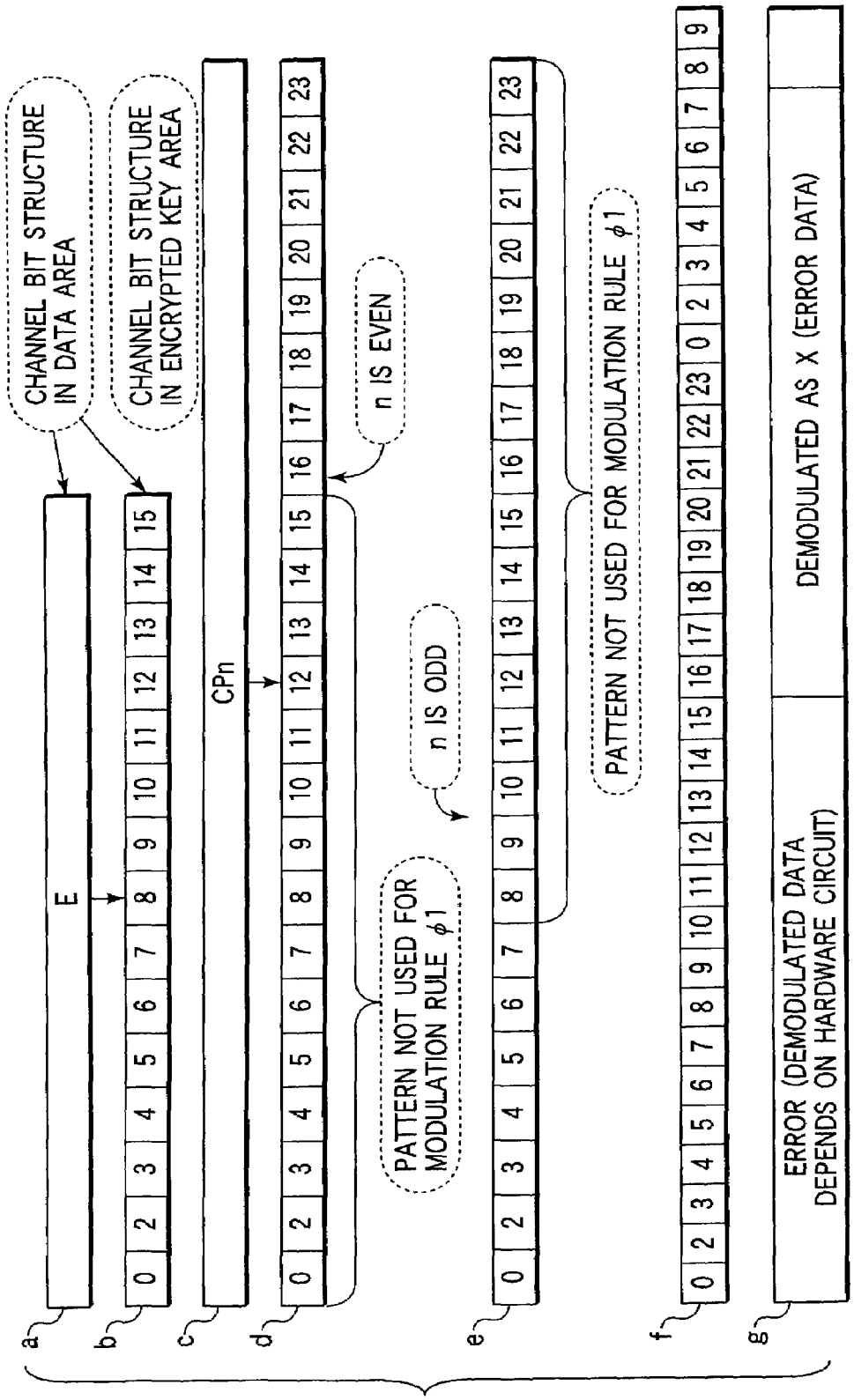
FIG. 18 is an explanatory diagram showing still another example that information modulated based on the second modulation rule $\phi 2$ is embedded in a modulated signal of main data.

FIG. 18 shows the relation of that conversion. The main data to be converted according to the table of the first modulation rule $\phi 1$ is converted to 16-channel bits (symbols "a" and "b"). In the encrypted key to be converted according to the second modulation rule $\phi 2$ table, the 8-bit data symbol is converted to 24-channel bits (symbols c to d).

The 16-channel bits of the 24-channel bits are embedded into a 16-channel bit area on the front half or rear half of the 24-channel bits as a pattern which is not used in the first modulation rule $\phi 1$ (portions indicated with symbols d and e). When extracting a modulated signal of the above-described encrypted key, a modulated signal is extracted from a preliminarily known area and the encrypted key can be demodulated by using an independent conversion table.

Another embodiment may be achieved as follows. That is, if in the symbol data CPn=CP0, CP1, CP3, . . . , n is even and odd, a place in which a pattern that is not used in the first modulation rule $\phi 1$ should be embedded may be set up in the front half and the rear half. An example in which the pattern that is not used in the first modulation rule $\phi 1$ is embedded in the front half is indicated with the symbol d, while an example that it is embedded in the rear half is indicated with the symbol e.

When the modulated signal of an encrypted key is extracted in this case, it is permissible to extract the modulated signal from a preliminarily known area and demodulate the encrypted key using the independent conversion table.

For example, in the main data modulator (first modulation rule $\phi 1$) based on the DVD standard, the distance from "1" to next "1" is 3 to 11 bits and a SYNC frame uses a 14-channel bit pattern. Then, a 12-channel bit pattern, which is gained by dividing the 24-channel bit pattern is disposed at the front half or rear half of the SYNC frame of a specific portion.

If the specific information is embedded in the physical sector, a pattern modulated by the second modulation rule $\phi 2$ is demodulated by demodulation $\phi^{-1}1$ corresponding to the first modulation rule $\phi 1$. Even if this data is modulated again according to the first modulation rule $\phi 1$ and converted to a recording pattern, copy of correct encrypted key information is disabled.

FIG. 18 shows an example that a channel bit stream connected to a data symbol CP2 of the modulated encrypted key information is demodulated by demodulation $\phi^{-1}1$. Although in the case of demodulation $\phi^{-1}1$, input data is divided by 16-channel bits and then demodulated, the first 16-channel bit pattern is not returned to its original pattern (although data depends on a demodulating hardware circuit).

Subsequently, the 8-channel bit pattern is coupled with the 8-channel bit pattern at the head side of a data symbol CP3 so as to form a 16-channel bit pattern, so that data "X" obtained based on that 16-channel bit pattern is demodulated (symbols f and g).

If such data is passed through the error correction circuit, the encrypted key information disappears by the correction processing.

However, if data which is not subjected to the error correction processing is transmitted out, this can be the same in the original 8-channel bits on the rear half side of the data symbol CP2 and 8-channel bits on the front half side by copy processing through the illegal copy path shown in FIG. 12. However, if such illegal copy is executed, the data symbols CP2 and CP3 cannot be copied because the 16-channel bit pattern on the front half side or the rear half side are of the same pattern. Consequently, the encrypted key is difficult to copy illegally.

If this structure is introduced, illegal copy of the encrypted key can be prevented even if there are few patterns which are used in the conversion table used for modulation of the main data.

Figure 19:
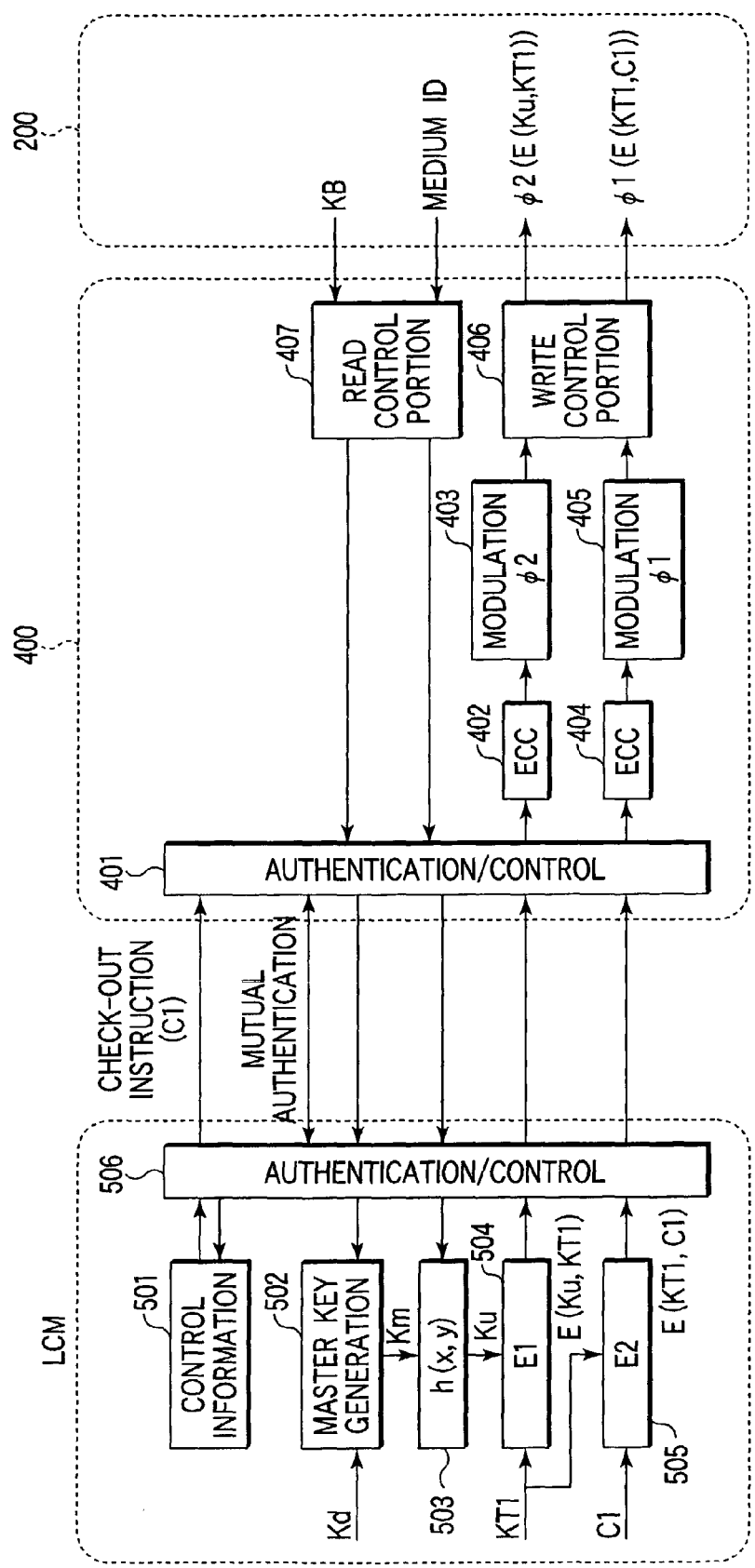
FIG. 19 is a diagram showing the block structure in a recording/reproducing apparatus according to another embodiment of the present invention or route of "check-out" processing.

FIG. 19 shows an example of the structure of the apparatus for carrying out the above-described processing.

A portion indicated with a block LCM denotes a content usage/control device. Reference numeral 400 denotes a drive and reference numeral 200 denotes a recording medium (for example an optical disc). The key group information KB and medium ID are recorded in the re-record disable area of the optical disc 200.

The content usage/control device LCM comprises a control information storage portion 501, master key generation portion 502, 2-variable converter 503, and encryption portions 504 and 505. Further, an authentication/control portion 506 for executing mutual authentication with the drive 400 is provided.

The drive 400 includes an authentication/control portion 401 for executing mutual authentication with the content usage/control device LCM, error correction code processing portion 402, modulator 403, error correction code processing portion 404, modulator 405, and write control portion 406. A read control portion 407 is also provided. Although usually, the write control portion 406 and the read control portion 407 are constructed integrally as an optical head control portion, they are provided for each function here. The mechanical operating portion, optical output portion and the like of the pickup portion (PUP) shown in FIG. 4 are not included in the write control portion 406 and the read control portion 407. The write control portion 406 and the read control portion 407 are constructed as an electric circuit portion, preferably as a semiconductor device.

Now, the operation for recording the content C1 (including control information for reproducing the content C1) into the recording medium 200 will be described. A "check-out" instruction for the content C1 is given to the authentication/control portion 401 of the drive 400 through the authentication/control portion 506. After the "check-out" instruction is received, the authentication/control portions 506 and 401 carry out mutual authentication. That is, whether they are devices permitted to exchange data between each other is certified. If the number of "children" which can be checked out of the content C1 described in the control information storage portion 501 is 0, the processing is terminated.

If the mutual authentication is carried out normally, mutual communication data between the content usage/control device LCM and the drive 400 is scrambled with a common key shared upon the mutual authentication.

The drive 400 reads the key group information KB and medium ID from the recording medium 200 through the read control portion 407 and transfers them to the content usage/control device LCM.

The master key generation portion 501 generates master key Km from the key group information KB read from the recording medium 200 and information Kd (usually called a device key) possessed by the recording/reproducing apparatus 100. The master key Km is input to the 2-variable converter 503. The 2-variable converter 503 processes the medium ID and master key Km inherent of the disc according to the 2-variable function h(x, y) so as to generate the medium inherent key Ku.

The medium inherent key Ku and the title key KT1 (corresponding to the title of the content C1) are input to the encryption portion 504. The encryption portion 504 encrypts the title key KT1 with the medium inherent key Ku so as to obtain encrypted title key E(Ku, KT1). The encrypted title key E(Ku, KT1) is transmitted to the drive 400. The title key KT1 encrypts the content C1 with the encryption portion 505. The encrypted content E(KT1, C1) is transmitted to the drive 400.

In the drive 400, the error correction code processing portion 402 attaches the error correction code (described in FIGS. 7 to 9) to the encrypted title key E(Ku, KT1) and supplies to the modulator 403. The modulator 403 modulates the encrypted title key E(Ku, KT1) subjected to error correction processing according to the second modulation rule φ2. The modulated encrypted title key φ2((Ku, KT1)) is supplied to the write control portion 406.

The error correction code processing portion 404 attaches the error correction code (described in FIGS. 7 to 9) to the encrypted content E(KT1, C1). The encrypted content subjected to this processing is modulated with the modulator 405 having the first modulation rule φ1 and is supplied to the write control portion 406 as the modulated encrypted content φ1(E(KT1, C1).

Here, the write control portion 406 embeds the modulated encrypted title key φ2(E(Ku, KT1)) into a specific frame of the physical sector as described with reference to FIGS. 14 to 18. The output (physical sector) of the write control portion 406 is written into the re-recordable area of the recording medium 200 and then, the "check-out" is terminated.

The content usage/control device LCM carries out the following processing for control information in the control information storage portion 501. The medium ID of a disc which is a "check-out" destination of the content C1 is employed as a descriptor and the number N of children which can be checked out is subtracted by 1 so as to secure (N−1).

Figure 20:
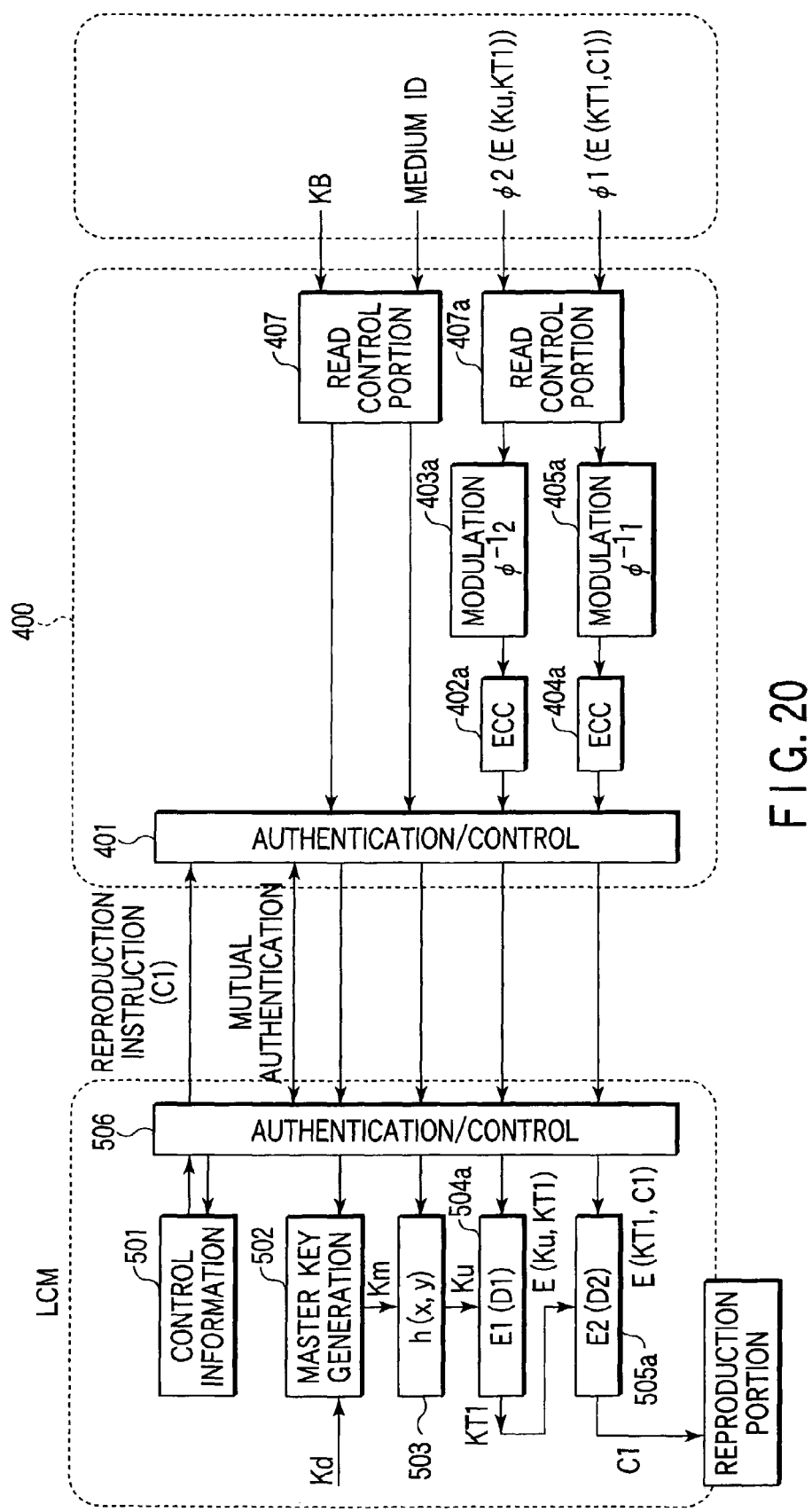
FIG. 20 is a diagram showing the block structure in the recording/reproducing apparatus according to the other embodiment of the present invention or route of reproduction processing.

FIG. 20 shows functional blocks for reproducing information recorded in the recording medium 200 as described above. If it is intended to reproduce the content C1, a reproduction instruction for the content C1 is transmitted from the content usage/control device LCM to the drive 400 through the authentication/control portion 506. The content usage/control device LCM and the drive 400 carry out mutual authentication through their authentication/control portions 506 and 401. If mutual authentication is achieved correctly, mutual transmission is started. The mutual communication data between the content usage/control device LCM and the drive 400 is scrambled with a common key shared upon the mutual authentication.

The drive 400 reads out the key group information KB and medium ID from the recording medium 200 through the read control portion 407 and transmits them to the content usage/control device LCM.

The physical sector of the recording medium is read through a read control portion 407a. As described previously, the modulated encrypted content φ1(E(KT1, C1)) and the modulated encrypted title key φ2(E(Ku, KT1)) are embedded in the physical sector. Because an embedding position is known preliminarily or it has a synchronous signal SYN-CP, the read control portion 407a separates the modulated encrypted title key φ2(E(Ku, KT1)) and the modulated encrypted content φ1(E(KT1, C1)).

The modulated encrypted title key φ2(E(Ku, KT1)) is input to a demodulator 403a which executes inverse-conversion (demodulation) $\phi^{-1}2$ of the second modulation rule φ2. The demodulated encrypted title key E(Ku, KT1) is input to an error correction code processing portion 402a. The modulated encrypted content φ1(E(KT1, C1)) is input to a demodulator 405a which executes inverse-conversion (demodulation) $\phi^{-1}1$ of the first modulation rule φ1. The demodulated encrypted content E(KT1, C1) is input to an error correction code processing portion 404a.

As for the relation between the first modulation rule φ1 and the second modulation rule φ2, even if a component X modulated according to the second modulation rule φ2 is demodulated based on the demodulation rule $\phi^{-1}$ of the first modulation rule φ1, the component X is not regained. That is, there is a relation satisfying $\phi^{-1}1(\phi 2(X)) \neq X$.

The demodulated encrypted title key E(Ku, KT1) is subjected to error correction processing at the error correction code processing portion 402a and transmitted to the content usage/control device LCM through the authentication/control portion 401. The demodulated encrypted content E(KT1, C1) is subjected to error correction processing by the error correction code processing portion 404a. The encrypted content E(KT1, C1) subjected to the error correction processing is transmitted to the content usage/control device LCM through the authentication/control portion 401.

In the content usage/control device LCM, the master key generation portion 501 generates the master key Km from the key group information KB read from the recording medium 200 and the information Kd (usually called device key) possessed by the recording/reproducing apparatus 100. The master key Km is input to the 2-variable converter 503. The 2-variable converter 503 processes the medium ID inherent of disc transmitted from the drive 400 and the generated master key Km with the 2-variable function h(x, y) so as to generate medium inherent key Ku.

In the meantime, the medium inherent key Ku is the same as the medium inherent key Ku shown in FIG. 19. The reason is that if the content of the key group information KB shown in FIG. 19 is the same as that of the medium ID, the relation between the key group information KB and the device key Kd is devised so as to obtain the same content as in FIGS. 19 and 20 under the medium inherent key Ku. That is, information corresponding to the device key Kd is included in the key group information KB. Because, in the case of an illegal apparatus, no information corresponding to the device key Kd is included in the key group information KB, no correct master key Km is acquired, and consequently, no correct medium inherent key Ku is acquired. If any illegal apparatus is found, a disc provider deletes information corresponding to that illegal apparatus from the key group information KB for next sale. As a result, distribution of illegal copies can be prevented.

The encrypted title key information E(Ku, KT1) and medium inherent key Ku transmitted from the drive 400 are input to a decryption portion 504A so as to decode the title key KT1. The encrypted content E(KT1, C1) transmitted from the drive 400 and the decrypted title key KT1 are input to a decryption portion 505A so as to decode the content C1.

Figure 21:
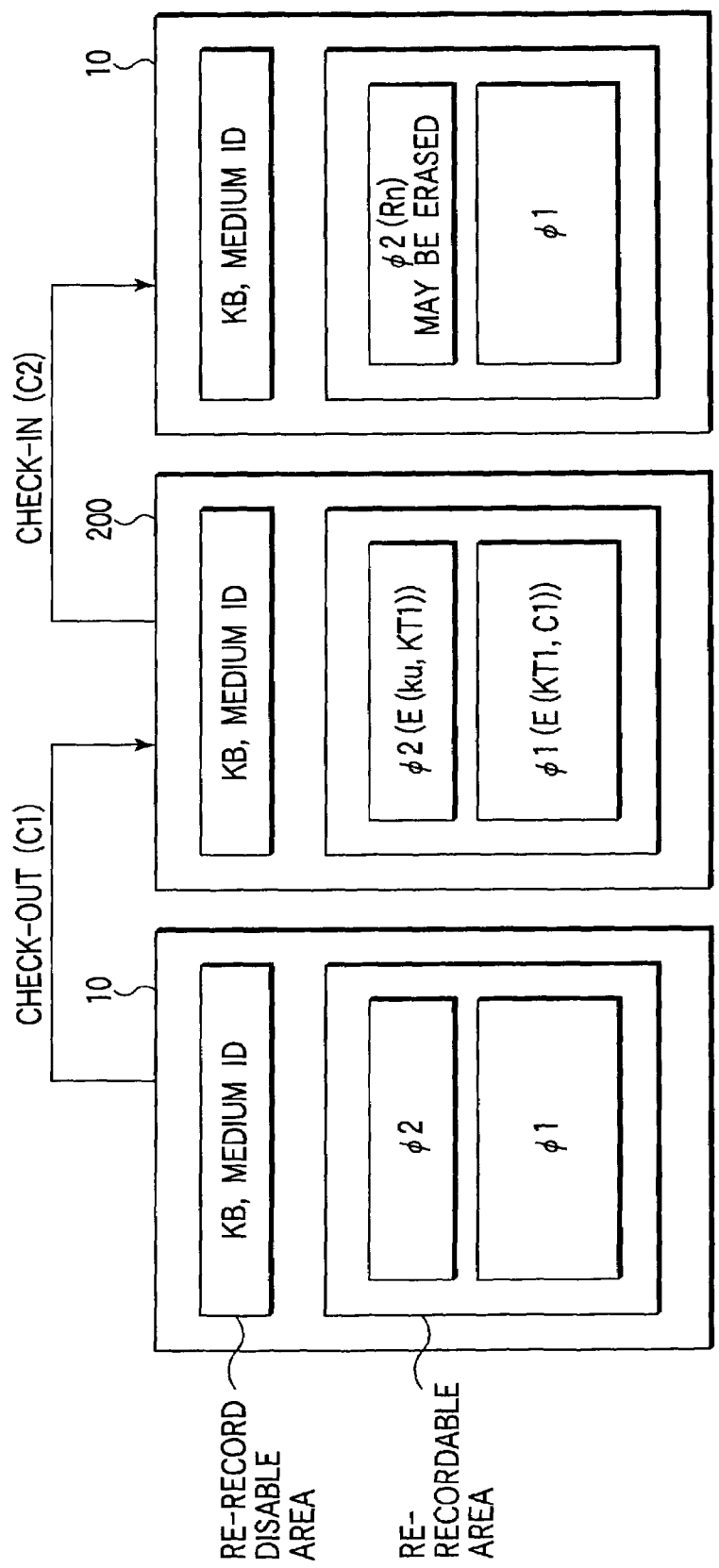
FIG. 21 is a diagram for explaining information on a recording medium in case where the "check-out" and "check-in" are executed in the apparatus of the embodiment of the present invention.

FIG. 21 shows the state of information recorded in the disc (recording medium) 10 and disc 200 when "check-out" is carried out from the disc 10 to the disc 200 and the state of information recorded in the disc 200 after "check-in" from the disc 200 to the disc 10 is carried out.

If the "check-out" is executed from the disc 10 to the disc 200, the modulated encrypted title key $\phi 2$(E(Ku, KT1)) and the modulated encrypted content $\phi 1$(E(KT1, C1) are recorded in the re-recordable area of the disc 200. Here, assume that processing "check-in" for returning information of the disc 200 to the disc 10 is carried out. Consequently, in the first example, the modulated encrypted title key $\phi 2$(E(Ku, KT1)) of the disc 200 is erased. In the second example, the modulated encrypted title key 100 2(E(Ku, KT1)) is destroyed by overwrite of random data. In the third example, the modulated encrypted content $\phi 1$(E(KT1, C1) is erased. In the fourth example, the modulated encrypted content $\phi 1$(E(KT1, C1) is destroyed by overwrite of random data. In the fifth example, the above-described first example to the fourth example are adopted in combination. The processing which takes the shortest time is the first or the second example.

According to the above-described method, even if all information in the re-recordable area is backed up and restored, an apparatus which dose not have a processing portion based on the second modulation rule $\phi 2$ cannot restore correctly. To execute the data processing based on the second modulation rule $\phi 2$, authentication processing needs to be carried out between the content usage/control device LCM and the drive 400. If the content of the disc is "checked-in" by the content usage/control device LCM, matching between the medium ID of a disc of "check-out" destination for the content C1 described in the control information of the LCM and the medium ID read out from the disc is checked. Only when both match each other, the "check-in" is carried out.

If the "check-in" is carried out, after the erasing or destruction according to the first to fifth examples is executed to a disc from which data is read, the number (number which allows the "check-out") of children of the content C1 described in the control information is incremented by 1.

The present invention is not restricted to the above-described embodiments.

Figure 22:
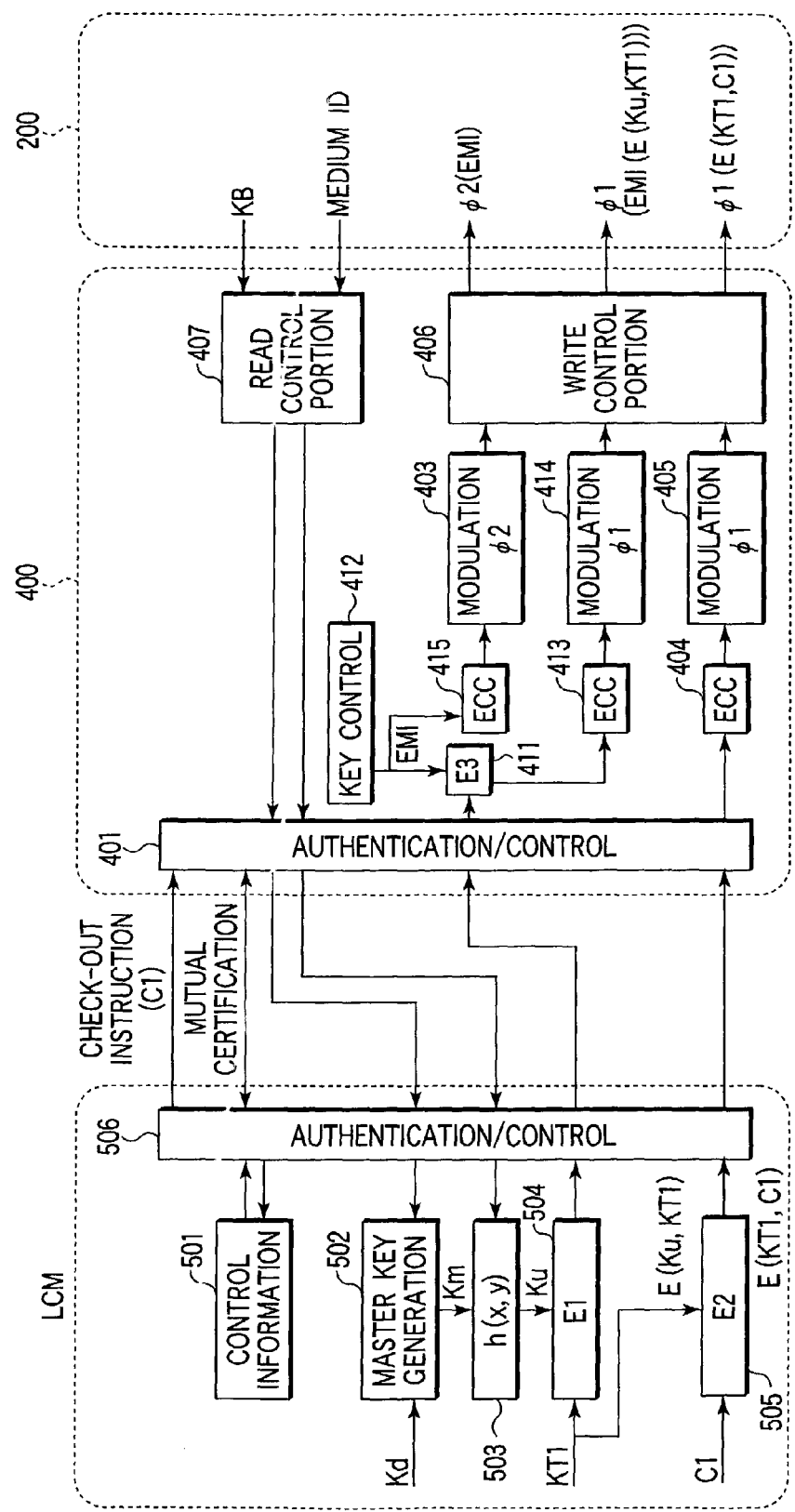
FIG. 22 is a diagram showing an example of another block structure in the recording/reproducing apparatus according to a still another embodiment of the present invention or route of "check-out" processing.

FIG. 22 shows still other embodiment of the present invention and indicates a functional block for executing the "check-out." Like reference numerals are attached to the same portions as the previous embodiment. Only portions different from the previous embodiment will be described. The inside of the drive 400 in this apparatus is different. The encrypted title key E(Ku, KT1) is supplied to an encryption portion 411. The encrypted title key E(Ku, KT1) is encrypted by the encryption portion 411 according to a random number EMI from the error correction code processing portion 412. An outer-code parity PO and an inner-code parity PI are attached to the double encrypted title key E(EMI, E(Ku, KT1)) obtained from the encryption portion 411 by the error correction code processing portion 413, so that a sector shown in FIG. 9 is acquired. That information is modulated by the modulator 414 based on the first modulation rule $\phi 1$ and output as the modulated double encrypted title key $\phi 1$(E(EMI, E(Ku, KT1))) and then input to the write control portion 406.

On the other hand, an error correction code is attached to a random number EMI by the error correction code processing portion 415 and modulated by the modulator 403 which functions based on the second modulation rule $\phi 2$. Its result is input to the write control portion 406 as the modulated random number $\phi 2$E(MI). The write control portion 406 embeds the modulated random number $\phi 2$E(MI) into a specific frame described in FIGS. 14 to 18 and write into the disc 200.

Figure 23:
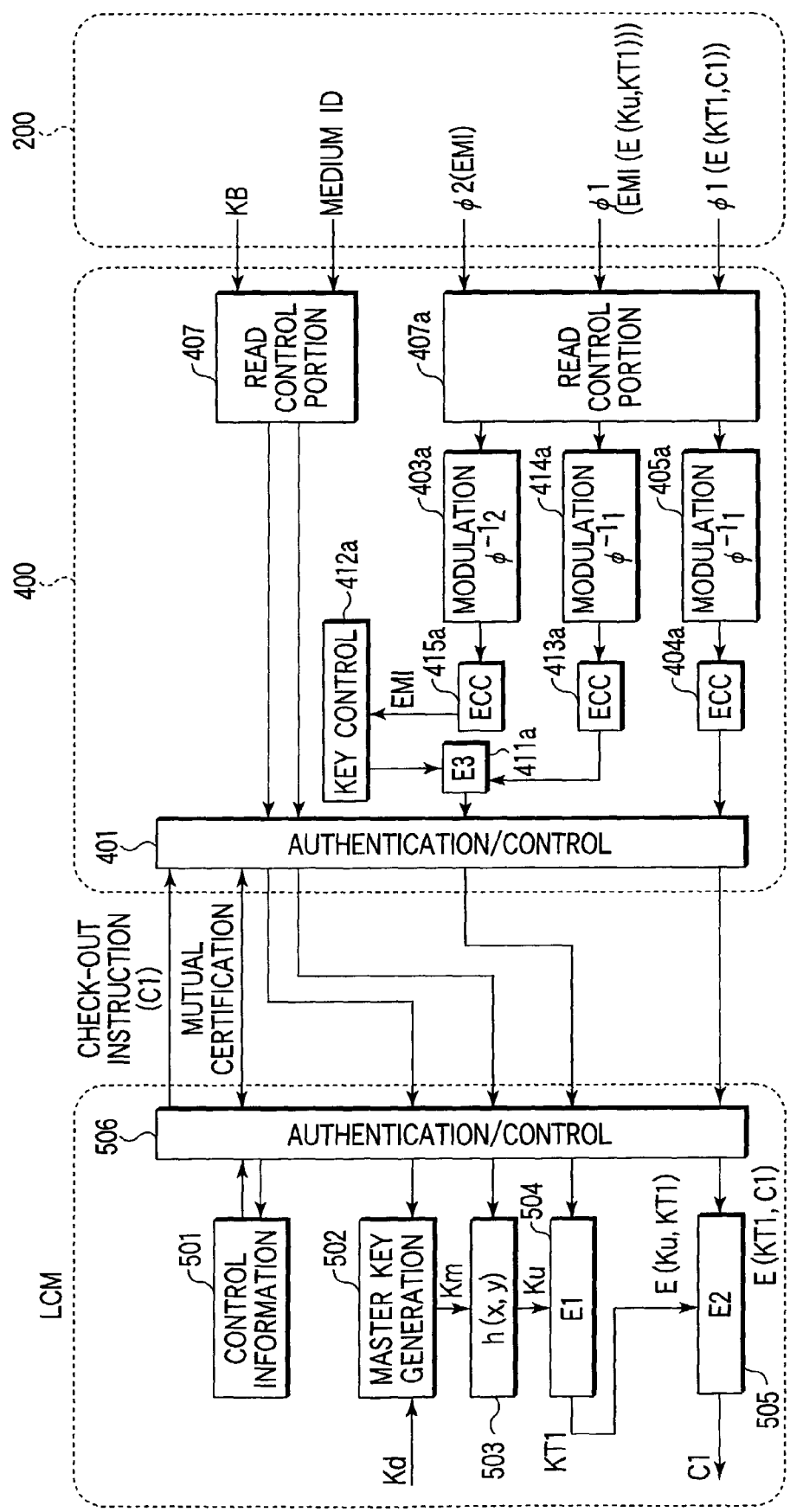
FIG. 23 is a diagram showing an example of another block structure in the recording/reproducing apparatus according to the still other embodiment of the present invention or route of reproduction processing.

FIG. 23 shows a functional block for reproducing information written in the recording medium 200 as described above. When the content C1 is reproduced, a reproduction instruction for the content C1 is transmitted from the content usage/control device LCM to the drive 400 through the authentication/control portion 506. The content usage/control device LCM and the drive 400 carry out mutual authentication through their authentication/control portions 506, 401. If mutual authentication is achieved correctly, mutual transmission is started. The mutual communication data between the content usage/control device LCM and the drive 400 is scrambled with a common key shared upon the mutual authentication.

Like reference numerals are attached to the same portions as the embodiment shown in FIG. 20. Only portions different from the previous embodiments will be mentioned.

The read control portion 407a reads the modulated double encrypted title key $\phi 1$(E(EMI, E(Ku, KT1)), modulated encrypted content $\phi 1$(E(KT1, C1), and modulated random number $\phi 2$E(MI) from the recording medium 200. The read control portion 407a separates this information and supplies them to corresponding demodulators 414a, 405a and 403a. The modulated random number $\phi 2$E(MI) is demodulated by the demodulator 403a, error correction processing is carried out by the error correction code processing portion 415a and EMI is supplied to the error correction code processing portion 412a. On the other hand, the modulated double encrypted title key $\phi 1$(E(EMI, E(Ku, KT1)) is demodulated by the demodulator 414a and the double encrypted title key E(EMI, E(Ku, KT1) is subjected to error correction processing by the error correction code processing portion 413a. Then, its result is supplied to the demodulator 411a. Here, the double encrypted title key E(EMI, E(Ku, KT1) is demodulated using the EMI from the error correction code processing portion 412a. Consequently, the encrypted title key E(Ku, KT1) is obtained and transmitted to the content usage/control device LCM. The other processing is the same as the example of FIG. 20.

FIG. 24 shows the encryption state of information recorded in the re-record disable area 211 and the re-recordable area 212.

Figure 25:
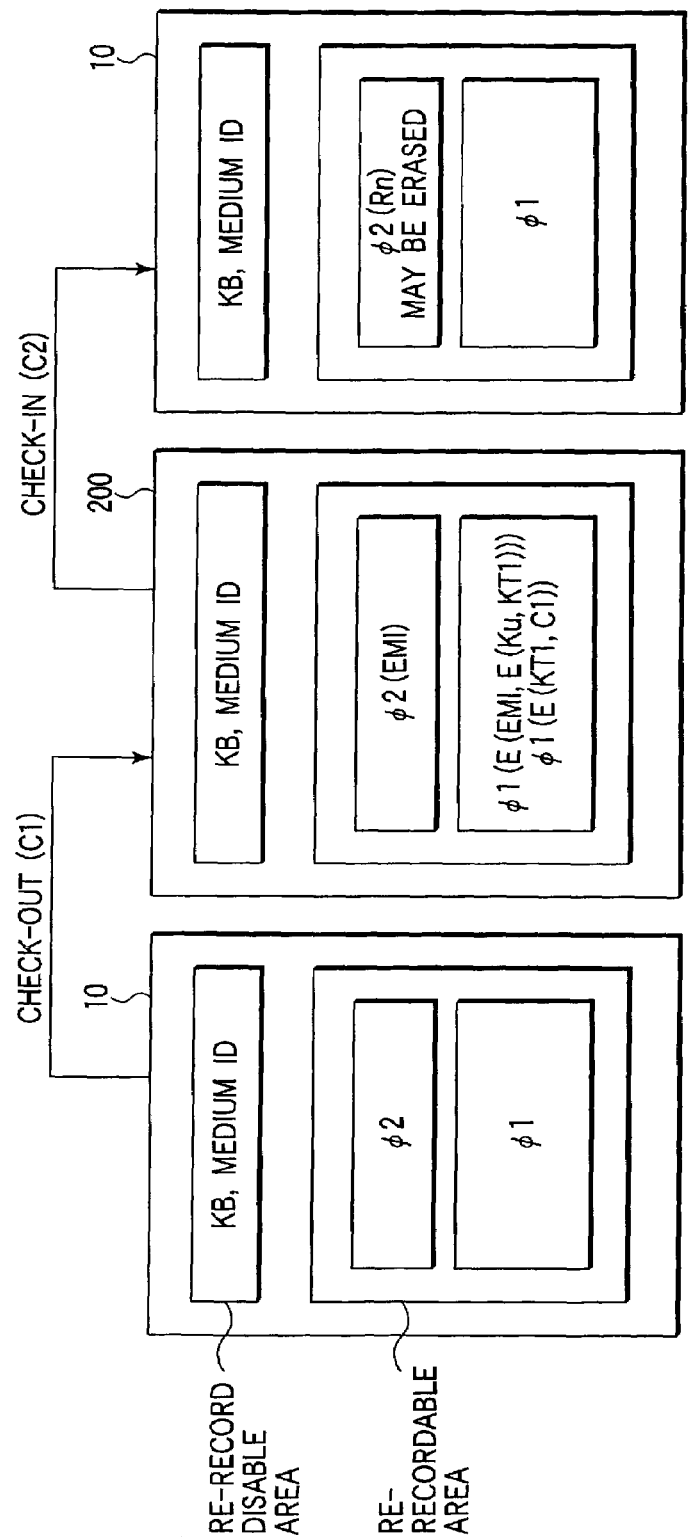
FIG. 25 is a diagram for explaining information on the recording medium in case where the "check-out" and "check-in" are carried out with the apparatus shown in FIGS. 22 and 23.

FIG. 25 shows the state of information recorded in the disc (recording medium) 10 and disc 200 when "check-out" is executed from the disc 10 to the disc 200 and the state of information recorded in the disc 200 after "check-in" is executed from the disc 200 to the disc 10.

If the "check-out" is executed from the disc 10 to the disc 200, the modulated encrypted random number $\phi 2$(EMI), the modulated encrypted content $\phi 1$(E(KT1, C1), and the modulated double encrypted title key $\phi 1$(E(EMI, E(Ku, KT1))) are recorded in the re-recordable area 212 of the disc 200. Assume that processing "check-in" for returning information in the disc 200 to the disc 10 is carried out.

Consequently, in the first example, the modulated encrypted random number φ2(EMI) in the disc 200 is erased. In the second example, the modulated encrypted random number φ2E(MI) in the disc 200 may be destroyed by overwrite of random data. In the third example, the modulated encrypted content φ1(E(KT1, C1) is erased. In the fourth example, the modulated encrypted content φ1(E(KT1, C1) may be destroyed by overwrite of random data. In the fifth example, the modulated double encrypted title key φ1(E(EMI, E(Ku, KT1)) may be erased or destroyed by overwrite of random data. In the sixth embodiment, the first example to the sixth example are adopted in combination. The processing which takes the shortest time is the above-mentioned first example or the second example.

The present invention is not restricted to the above-described embodiments. According to the present invention, basically when writing at least the first information K1 including the encrypted content and the second information K2 including a component for decrypting the first information K1 into a re-recordable area, the first information K1 is modulated based on the first modulation rule φ1 so as to acquire information φ1(K1) and the second information is modulated based on the second modulation rule φ2 so as to acquire information φ2(K2) and then, this information is written into the re-recordable area.

The first information K1 includes E(KT1, C1) and/or (EMI, E(Ku, KT1)). The second information K2 includes E(Ku, KT1) or EMI.

Figure 26:
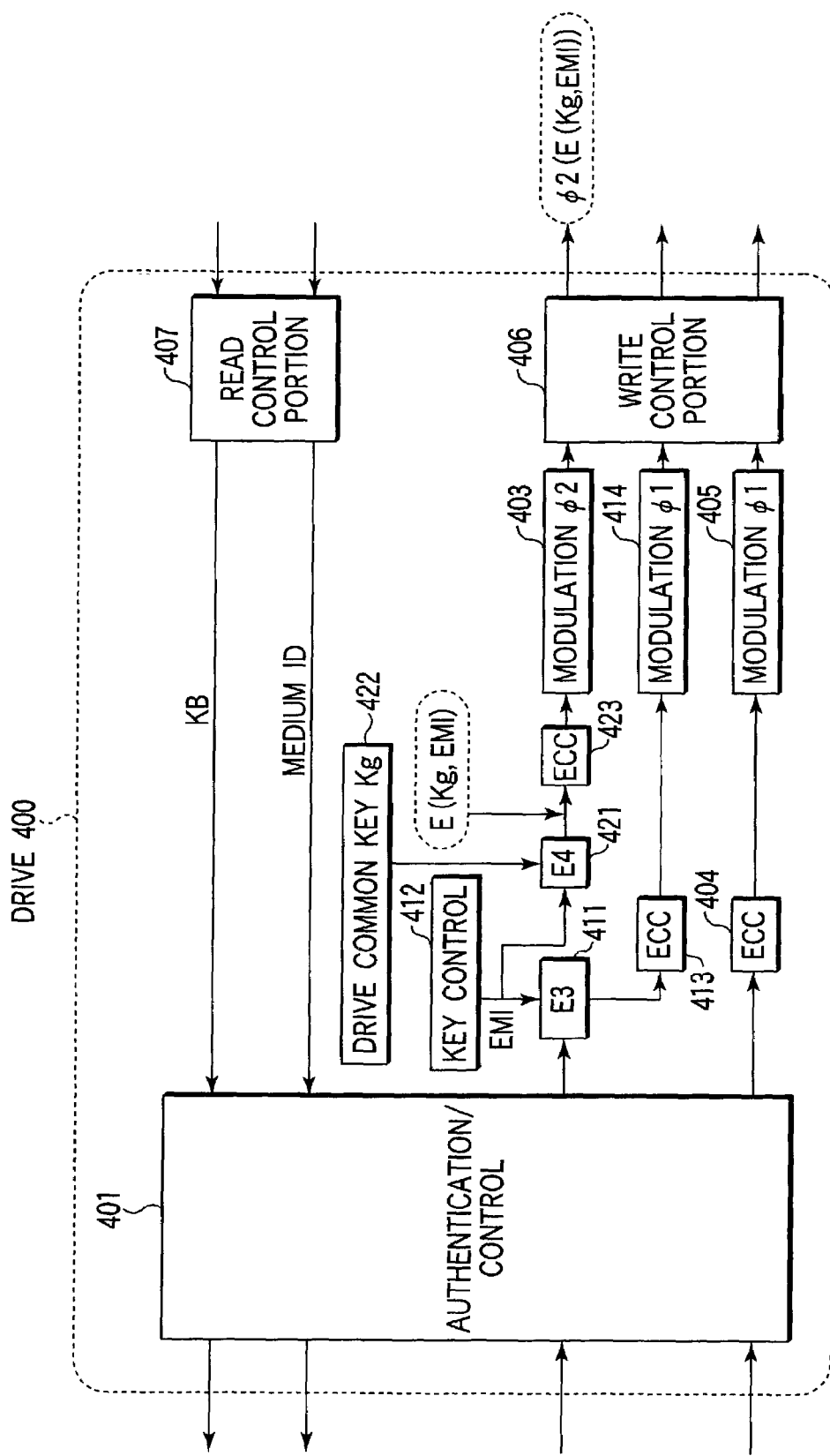
FIG. 26 is a diagram showing the block structure of a drive according to a further embodiment of the present invention.

Still other example shown in FIG. 26 will be described. Like reference numerals are attached to the same portions as in the drive 400 shown in FIG. 22. In the example shown in FIG. 22, the random number EMI obtained from the error correction code processing portion 412 is subjected to error correction processing, modulated directly based on the second modulation rule φ2 and recorded in the recording medium 200. However, in the example of FIG. 26, the random number EMI from the error correction code processing portion 412 is introduced to the encryption portion 421 and encrypted with a drive common key Kg from a drive common key holding portion 422. An error correction code is attached to the encrypted random number E(Kg, EMI) by an error correcting portion 423 and modulated based on the second modulation rule φ2 so as to acquire modulated encrypted random number φ2(E(Kg, EMI)). Then, the modulated encrypted random number φ2(E(Kg, EMI)) is recorded in the recording medium 200.

As a result, even if for example the second modulation rule φ2 is leaked, the content of the random number is never decrypted immediately.

FIG. 27 shows still another embodiment of the present invention. Like reference numerals are attached to the same portions as in the drive 400 shown in FIG. 26. In the example of FIG. 27, the drive common key Kg is input to the drive inherent key generation portion 422. The drive inherent key generation portion 422 generates a drive inherent key Kud using a group key KB'. Then, a random number EMI from the error correction code processing portion 412 is encrypted by the encryption portion 421 so as to obtain the encrypted random number E(Ku, EMI). An error correction code is attached to the encrypted random number E(Kud, EMI) and modulation based on the second modulation rule φ2 is carried out so as to obtain modulated encrypted random number φ2(E(Kg, EMI)). Then, the modulated encrypted random number φ2(E(Kg, EMI)) is recorded in the recording medium 200.

As a result, when a drive which executes illegal action such as illegal copy is made evident, a disc manufacturer can block generation of a correct drive inherent key Kud in the drive which executes this illegal action by selling a disc in which part of the group key KB' is changed.

When the above-described embodiments are carried out, it is preferable that the modulator and the demodulator in the drive 400 are constructed with a single semiconductor device in order to enhance its concealability. Further, it is also preferable that an error correction code processing portion is constructed with the modulator and demodulator in a semiconductor device. Further, the entire drive 400 including the read control portion and the write control portion may be constructed as a semiconductor device.

The recording medium having only the read enable area and re-recordable area is capable of executing the same content control by generating the medium inherent key Ku from the random number generator instead of generating from the medium ID, and Kd.

What is claimed is:

1. An information recording method for recording information in a re-recordable area of an information storage medium, comprising:
    encrypting content and administration information of the content by using key information to generate encrypted information;
    modulating, based on a first modulation rule φ1, the encrypted information into first recording information;
    modulating, based on a second modulation rule φ2, the key information into second recording information, wherein the first modulation rule φ1 and the second modulation rule φ2 satisfy the following relationship:

$$\phi 1\ (\phi^{-1}1(\phi 2(X)))\neq \phi 2(X),$$

where X comprises information, φ1(X) comprises information which is obtained by modulating the information X by using the first modulation rule φ1, φ2(X) comprises information which is obtained by modulating the information X by using the second modulation rule φ2, $\phi^{-1}1(X)$ comprises an inverse-modulation rule of the first modulation rule φ1(X), and $\phi^{-1}2(X)$ comprises an inverse-modulation rule of the second modulation rule φ2(X);
    combining the first recording information and the second recording information such that the second recording information is embedded in a predetermined portion of the first recording information to obtain combined information and recording the combined information into the re-recordable area of the recording medium.

2. The method according to claim 1, wherein the encrypted information comprises encrypted content control information.

3. An information reproduction method for reproducing the content information from the recording medium in which the information is recorded by the recording method according to claim 1, comprising:
    reading the first recording information from the re-recordable area of the recording medium and inverse-modulating, based on a first inverse-modulation rule $\phi 1^{-1}$ of the first modulation rule φ1, the read first information to obtain original encrypted information;
    reading the second recording information from the re-recordable area of the recording medium and inverse-modulating, based on a second inverse-modulation rule $\phi 2^{-1}$ of the second modulation rule φ2, the read second information to obtain original second information; and
    decrypting the original encrypted information by using the original key information.

4. The method according to claim 3, wherein the encrypted information comprises encrypted content control information.

5. An information recording apparatus for recording information in re-recordable area of an information storage medium, comprising:
   an encrypting portion which encrypts content and administration information of the content by using key information to generate encrypted information;
   a first modulator which modulates, based on a first modulation rule $\phi 1$, the encrypted information into first recording information and writes the first recording information into the re-recordable area; and
   a second modulator which modulates, based on a second modulation rule $\phi 2$, the key information into second recording information and writes the second recording information into the re-recordable area, wherein the first modulation rule $\phi 1$ and the second modulation rule $\phi 2$ satisfy the following relationship:

$$\phi 1\ (\phi^{-1}1(\phi 2(X))) \neq \phi 2(X),$$

where X comprises information, $\phi 1(X)$ comprises information which is obtained by modulating the information X by using the first modulation rule $\phi 1$, $\phi 2(X)$ comprises information which is obtained by modulating the information X by using the second modulation rule $\phi 2$, $\phi^{-1}1(X)$ comprises an inverse-modulation rule of the first modulation rule $\phi 1(X)$, and $\phi^{-1}2(X)$ comprises an inverse-modulation rule of the second modulation rule $\phi 2(X)$;
   a writing unit which combines the first recording information and the second recording information such that the second recording information is embedded in a predetermined portion of the first recording information to obtain combined information and records the combined information into the re-recordable area of the recording medium.

6. The apparatus according to claim 5, wherein
   (a) the first modulator comprises:
      (i) a first encrypting section which encrypts a title key for encrypting the content information to obtain an encrypted title key; and
      (ii) a second encrypting section which encrypts the encrypted title key based on a random number to obtain a double encrypted title key as the administration information;
   (b) the second modulator comprises:
      (i) an encrypting section which encrypts the random number based on a medium inherent key to obtain an encrypted random number as the second recording information.

7. An information reproduction apparatus for reproducing the content information from the recording medium in which the information is recorded by the recording apparatus according to claim 5, comprising:
   a first inverse-modulator which reads the first recording information from the re-recordable area of the recording medium and inverse-modulates, based on a first inverse-modulation rule $\phi 1^{-1}$ of the first modulation rule $\phi 1$, the read first recording information to obtain original first information;
   a second inverse-modulator which reads the second recording information from the re-recordable area of the recording medium and inverse-modulates, based on a second inverse-modulation rule $\phi 2^{-1}$ of the second modulation rule $\phi 2$, the read second recording information to obtain original second information; and
   a decrypting portion which decrypts the original encrypted information by using the original key information.

8. The apparatus according to claim 7, wherein
   the second recording information comprises an encrypted random number;
   the second inverse-modulator decrypts the encrypted random number to obtain the random number;
   the first recording information comprises a double encrypted title key; and
   the first inverse-modulator comprises a first decrypting portion which decrypts the double encrypted title key based on the random number obtained by the second inverse-modulator to obtain an encrypted title key, and a second decrypting portion which decrypts the encrypted title key based on a medium inherent key to obtain an original title key.

9. An information recording method of a medium drive for recording information in re-recordable area of an information storage medium, comprising:
   encrypting in the medium drive, based on a first encryption rule $\phi 1$, first information including the content information to obtain encrypted first information;
   encrypting in the medium drive, based on a second encryption rule $\phi 2$, second information including a component for obtaining the first information to obtain encrypted second information; and combining the first recording information and the second recording information such that the second recording information is embedded in a predetermined portion of the first recording information to obtain combined information and writing the combined information into the re-recordable area of the recording medium, wherein the first encryption rule $\phi 1$ and the second encryption rule $\phi 2$ satisfy the following relationship:

$$\phi 1(\phi^{-1}1(\phi 2(X))) \neq \phi 2(X),$$

where X comprises information, $\phi 1(X)$ comprises information which is obtained by encrypting the information X by using the first encryption rule $\phi 1$, $\phi 2(X)$ comprises information which is obtained by encrypting the information X by using the second encryption rule $\phi 2$, $\phi^{-1}1(X)$ comprises a decryption rule of the first encryption rule $\phi 1(X)$, and $\phi^{-1}2(X)$ comprises a decryption rule of the second encryption rule $\phi 2(X)$.

10. The method according to claim 9, wherein the first information comprises a key for encrypting the content information.

11. The method according to claim 9, wherein the second information is supplied from an external device connected to the medium drive and comprises an encrypted title key, the title key encrypting the content information.

12. An information reproduction method for reproducing content information from the recording medium in which the information is recorded by the recording method according to claim 9, comprising:
   reading the encrypted first information and the encrypted second information from the re-recordable area of the recording medium;
   decrypting in the medium drive, based on a first decryption rule $\phi 1^{-1}$ of the first encryption rule $\phi 1$, the encrypted first information to obtain original first information; and decrypting in the medium drive, based on a second decryption rule $\phi 2^{-1}$ of the second encryption rule $\phi 2$, the encrypted second information to obtain original second information.

13. The method according to claim 12, wherein the first information comprises a key encrypting the content information.

14. The method according to claim 12, wherein the second information is supplied to an external device connected to the medium drive and comprises an encrypted title key, the title key encrypting the content information.

15. An information recording apparatus for recording information in re-recordable area of an information storage medium, comprising:
  a first encrypting portion which encrypts, based on a first encryption rule $\phi 1$, first information including the content information to obtain encrypted first information;
  a second encrypting portion which encrypts, based on a second encryption rule $\phi 2$, second information including a component for obtaining the first information to obtain encrypted second information; and
  a writing portion which combines the first information and the second information such that the second recording information is embedded in a predetermined portion of the first recording information to obtain combined information and writes the combined information into the re-recordable area of the recording medium, wherein the first conversion rule $\phi 1$ and the second conversion rule $\phi 2$ satisfy the following relationship:

$$\phi 1\ (\phi^{-1}1(\phi 2(X))) \neq \phi 2(X),$$

where X comprises information, $\phi 1(X)$ comprises information which is obtained by encrypting the information X by using the first encryption rule $\phi 1$, $\phi 2(X)$ comprises information which is obtained by encrypting the information X by using the second encryption rule $\phi 2$, $\phi^{-1}1(X)$ comprises a decryption rule of the first encryption rule $\phi 1(X)$, and $\phi^{-1}2(X)$ comprises a decryption rule of the second encryption rule $\phi 2(X)$.

16. The apparatus according to claim 15, wherein the second information is supplied from an external device connected to the medium drive and comprises an encrypted title key, the title key encrypting the content information.

17. An information reproduction apparatus for reproducing information from the recording medium in which the information is recorded by the recording apparatus according to claim 15, comprising:
  a reading portion which reads the encrypted first information and the encrypted second information from the re-recordable area of the recording medium;
  a first decrypting portion which decrypts, based on a first decryption rule $\phi 1^{-1}$ of the first encryption rule $\phi 1$, the encrypted first information to obtain original first information; and
  a second decrypting portion which decrypts, based on a second decryption rule $\phi 2^{-1}$ of the second encryption rule $\phi 2$, the encrypted second information to obtain original second information.

18. The apparatus according to claim 17, wherein
  the second information comprises an encrypted random number;
  the second decrypting portion decrypts the encrypted random number to obtain an original random number;
  the first information comprises a double encrypted title key; and
  the first decrypting portion comprises a first decryptor which decrypts the double encrypted title key based on the random number obtained by the second decrypting portion to obtain an encrypted title key, and a second decryptor which decrypts the encrypted title key based on a medium inherent key to obtain an original title key.

* * * * *